May 9, 1944. J. B. McKIM Re. 22,476

TELEPHONE SYSTEM

Original Filed Jan. 5, 1940 11 Sheets-Sheet 1

INVENTOR
J. B. McKIM
BY P. C. Smith
ATTORNEY

TELEPHONE SYSTEM

Original Filed Jan. 5, 1940 11 Sheets-Sheet 2

INVENTOR
J. B. McKIM
BY
P. C. Smith
ATTORNEY

May 9, 1944. J. B. McKIM Re. 22,476

TELEPHONE SYSTEM

Original Filed Jan. 5, 1940 11 Sheets-Sheet 3

INVENTOR
J. B. McKIM
BY
P. C. Smith
ATTORNEY

TELEPHONE SYSTEM

Original Filed Jan. 5, 1940 11 Sheets-Sheet 4

INVENTOR
J.B. McKIM
BY
P.B. Smith
ATTORNEY

TELEPHONE SYSTEM

Original Filed Jan. 5, 1940 11 Sheets-Sheet 5

INVENTOR
J. B. McKIM
BY
P. C. Smith
ATTORNEY

TELEPHONE SYSTEM

Original Filed Jan. 5, 1940 11 Sheets-Sheet 6

INVENTOR
J. B. Mc KIM
BY P. C. Smith
ATTORNEY

TELEPHONE SYSTEM

Original Filed Jan. 5, 1940 11 Sheets-Sheet 7

INVENTOR
J. B. McKIM
BY
P. C. Smith
ATTORNEY

May 9, 1944. J. B. McKIM Re. 22,476

TELEPHONE SYSTEM

Original Filed Jan. 5, 1940 11 Sheets-Sheet 8

INVENTOR
J. B. McKIM
BY P. C. Smith
ATTORNEY

TELEPHONE SYSTEM

Original Filed Jan. 5, 1940 11 Sheets-Sheet 9

INVENTOR
J. B. McKIM
BY
P. C. Smith
ATTORNEY

May 9, 1944. J. B. McKIM Re. 22,476

TELEPHONE SYSTEM

Original Filed Jan. 5, 1940 11 Sheets-Sheet 10

INVENTOR
J. B. McKIM
BY
P. C. Smith
ATTORNEY

TELEPHONE SYSTEM
Original Filed Jan. 5, 1940 11 Sheets-Sheet 11
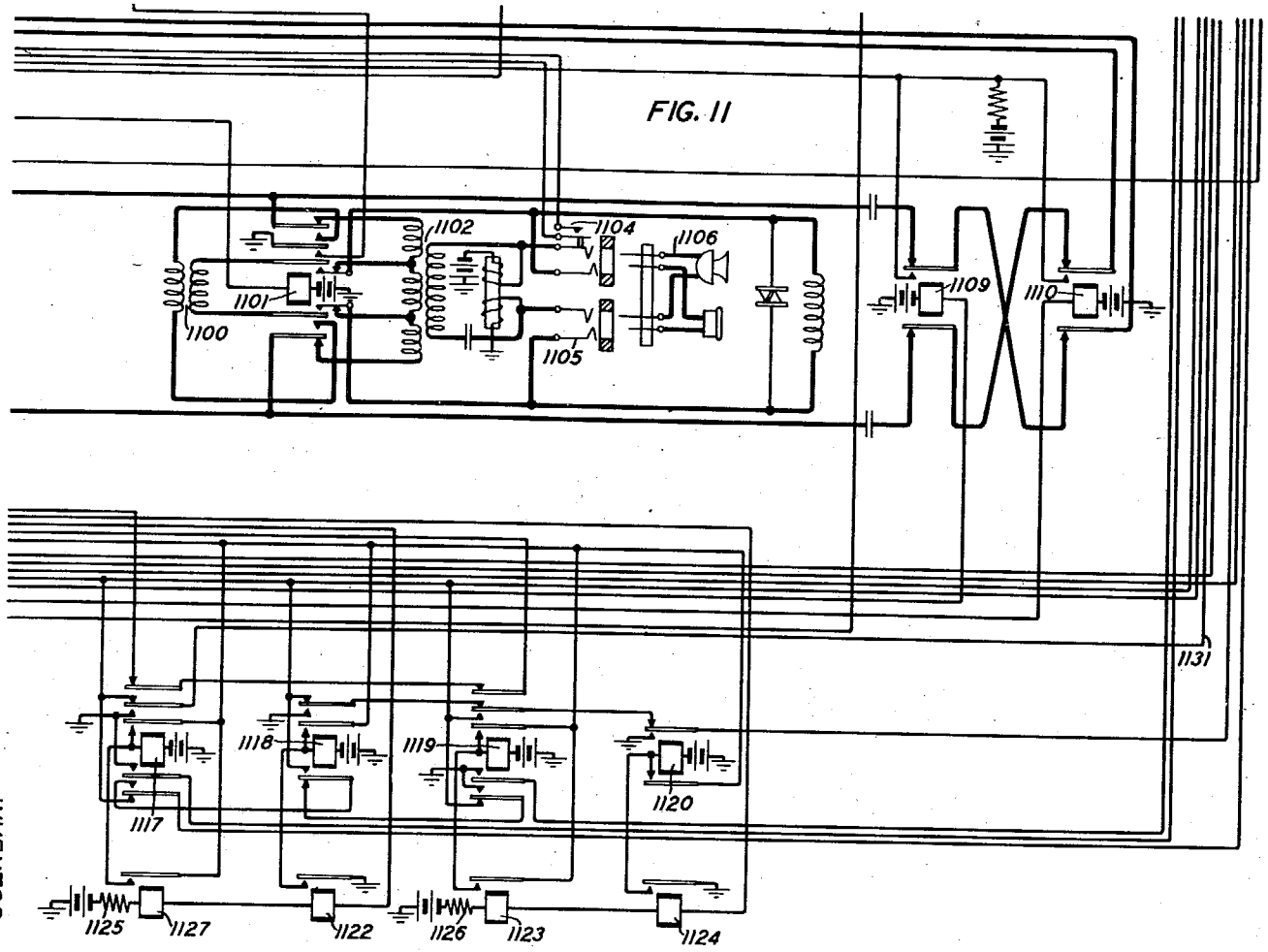
INVENTOR
J. B. McKIM
BY
P. C. Smith
ATTORNEY Reissued May 9, 1944

Re. 22,476

UNITED STATES PATENT OFFICE 22,476

TELEPHONE SYSTEM

James B. McKim, East Orange, N. J., assignor to Bell Telephone Laboratories, Incorporated, New York, N. Y., a corporation of New York Original No. 2,277,600, dated March 24, 1942, Serial No. 312,468, January 5, 1940. Application for reissue July 1, 1942, Serial No. 449,275

20 Claims. (Cl. 179—27)

This invention relates to telephone systems and more particularly to switching systems for automatically connecting units of equipment together for telephone connections and supervision.

Switching systems which are automatically responsive to incoming telephone calls have included link structures for connecting units of equipment together which serve either as transmission paths or for setting equipment for completing a telephone connection. Links used for transmission paths for telephone connections are held in place for the duration of the telephone connection. Other links used for temporarily connecting units of equipment together have been released after the connected equipments have completed their functions in setting switches or other units of equipment for completing a telephone connection. In the latter method of operation it is often necessary to recall the services of the same link or a link of like structure in the same group of links one or more times for supervisory purposes after a telephone connection has been completed. The selection and operation of links for supervisory purposes constitute a delay in the continuity of telephone service which with the present invention may be avoided.

An object of this invention is, therefore, to provide channels including a link between the equipments involved in a telephone connection and an operator's position, which may be automatically or manually locked for supervision of particular classes of telephone connections and automatically or manually released when the class of the telephone connection requires little or no supervision from this operator's position.

A feature of this invention is in a system of selecting and operating an idle link responsive to an incoming call over a trunk line for connecting the trunk line to a channel in an operator's position, in connecting the incoming trunk line to an outgoing trunk line and in controlling the locking or releasing of the link and channel responsive to signals registering the class of the incoming and the outgoing trunk lines involved in the telephone connections.

Another and related feature of this invention is in a system of selecting and operating an idle link responsive to an incoming call over a trunk line for connecting the trunk line to a channel in an operator's position, in transmitting signals between the trunk line and the position channel, in setting a control unit from the operator's position for automatically completing a telephone connection and in automatically controlling the locking or releasing of the link and channel responsive to the signals registered in the control unit.

Another and releated feature is in a system of automatically controlling the locking or releasing of the link and channel by transmitting class signals from the trunk line to the control unit, responsive to the connection of the link to the position channel and responsive to the connection of the control unit to the position circuit.

Another and releated feature is a system for manually controlling the locking of the link and channel to the trunk line connection for the duration of the call or releasing the link and channel therefrom.

Another feature lies in means responsive to a recall on an established connection for signaling the same operator over a locked link or summoning an idle operator where the link has been released.

These and other features will be discussed more fully in the following description.

To illustrate the features of the invention reference may be had to the accompanying drawings in which:

Figs. 1 to 11, inclusive, when arranged as indicated in Fig. 12 show the detailed structure in which a link and channel may be locked to the apparatus involved in a telephone connection for supervisory purposes;

Figs. 7, 10 and 11 illustrate a cordless toll operator's position circuit;

Figure 9:
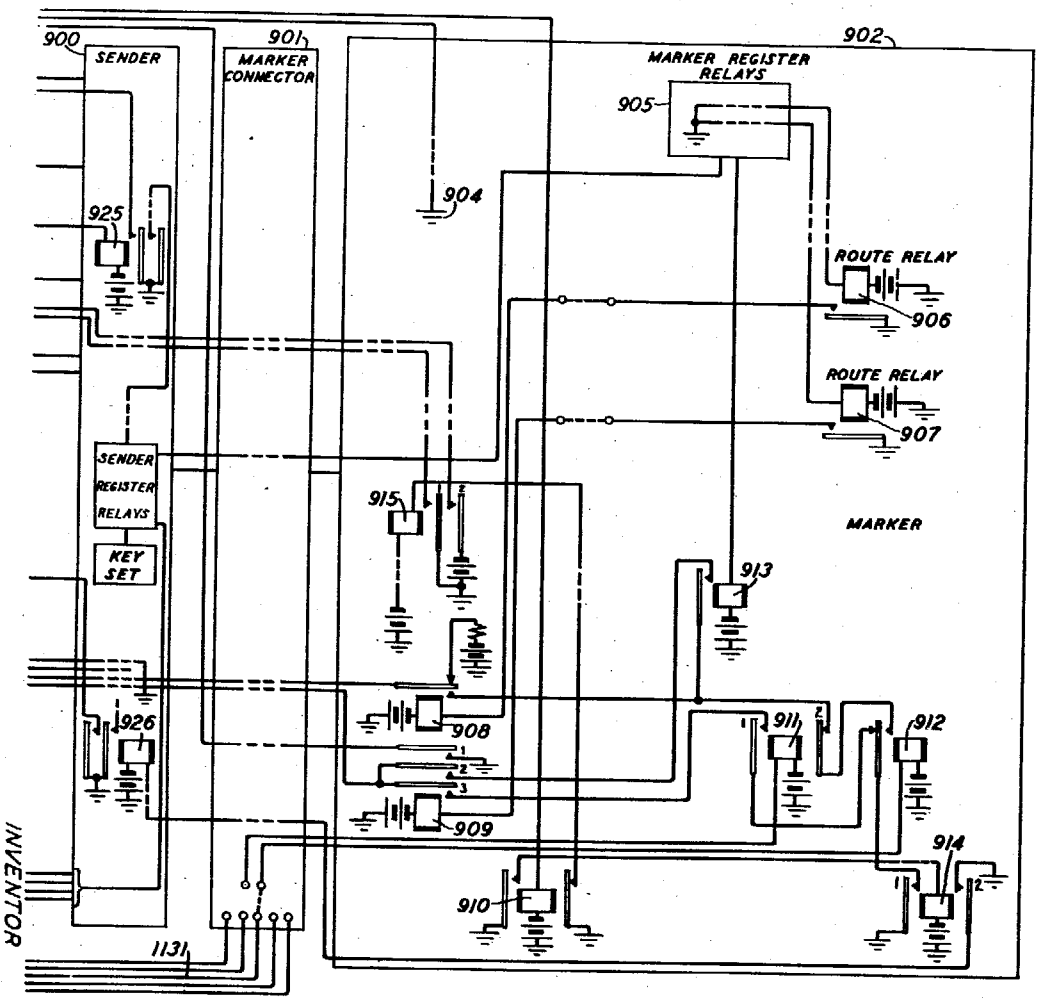

Fig. 9 diagrammatically illustrates an operator's position sender, a connector for connecting such senders to one of a plurality of markers and the apparatus of a marker which may be used to disclose the invention.

General Description

The trunks incoming to a toll office vary in transmission characteristics and also vary in character. Via or termial ringdom trunks incoming from a distant toll office operate from alternating current signals. Other toll offices may use the straightforward trunking system transmitting direct current signals for energizing the incoming trunks of a distant office. Other trunks are known as dial intertoll trunks which are operated from pulse transmitting systems for automatically operating apparatus in a machine switching office. In view of this the trunks involved in a toll connection require different class of service signaling means depending upon the character of the trunk. Signal transmitting apparatus is included in each such trunk for indicating to the associated apparatus of an automatically operable toll office, the character of the trunk connected to this apparatus in order that the same character of trunks shall or shall not be connected together for transmission purposes, and in order that it shall be determined whether supervision of the telephone connection is required. The same or different characters of intertoll trunks are connected together depending upon the length of the interconnected toll trunks for completing a telephone connection. It is therefore necessary that the connecting apparatus be guided in the matter of class of intertoll trunk and the transmission characteristics of both interconnected trunks. In the system disclosed, such information is automatically available responsive to the connection of an incoming trunk with the connecting apparatus and responsive to the registrations for selecting an outgoing trunk to a local or distant office.

Figure 1:
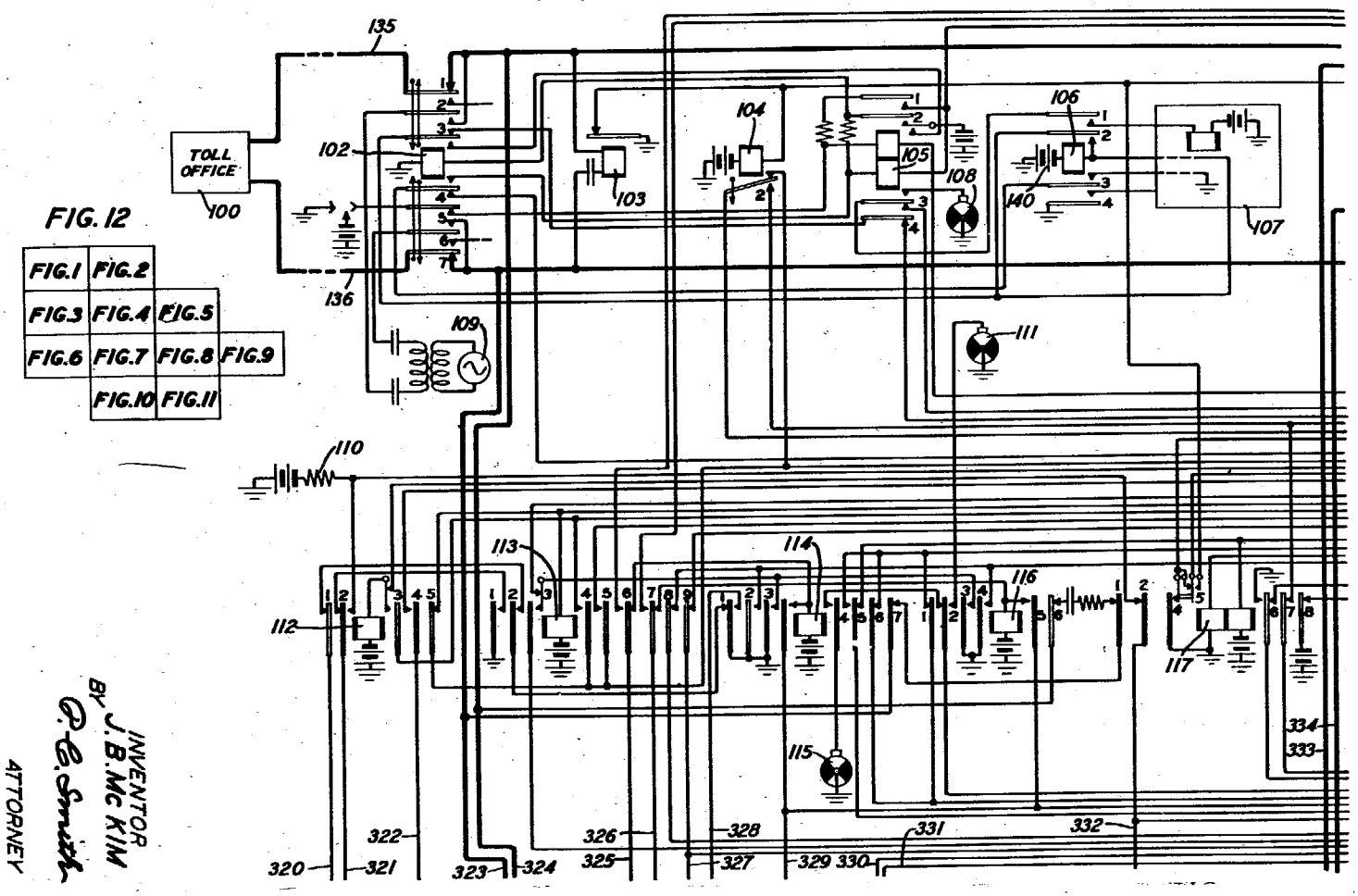
Figs. 1 and 2 illustrate a distant calling toll office, an incoming trunk, an outgoing trunk, a plurality of switches for connecting incoming and outgoing trunks and a distant called toll office.
Figure 2:
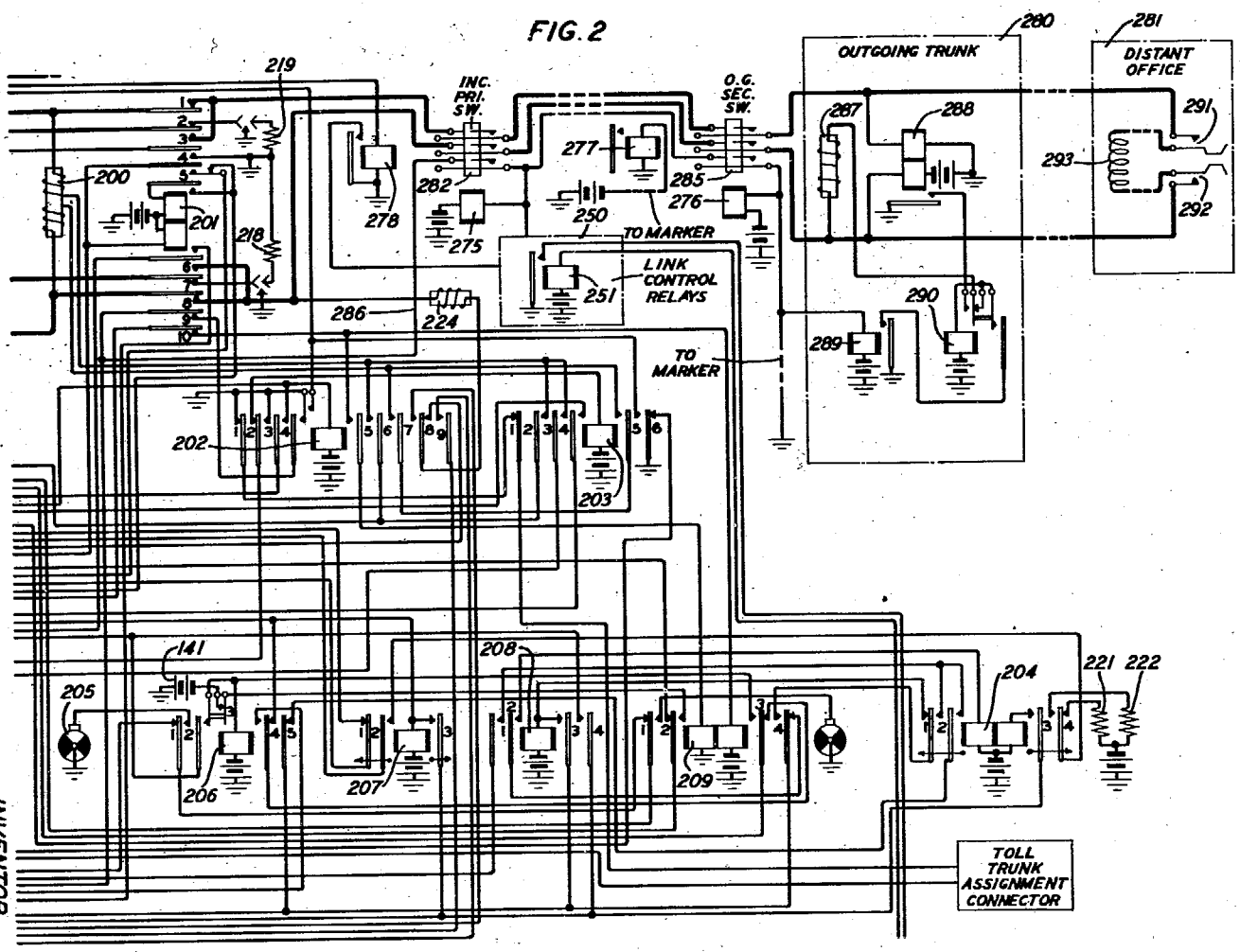
Figure 6:
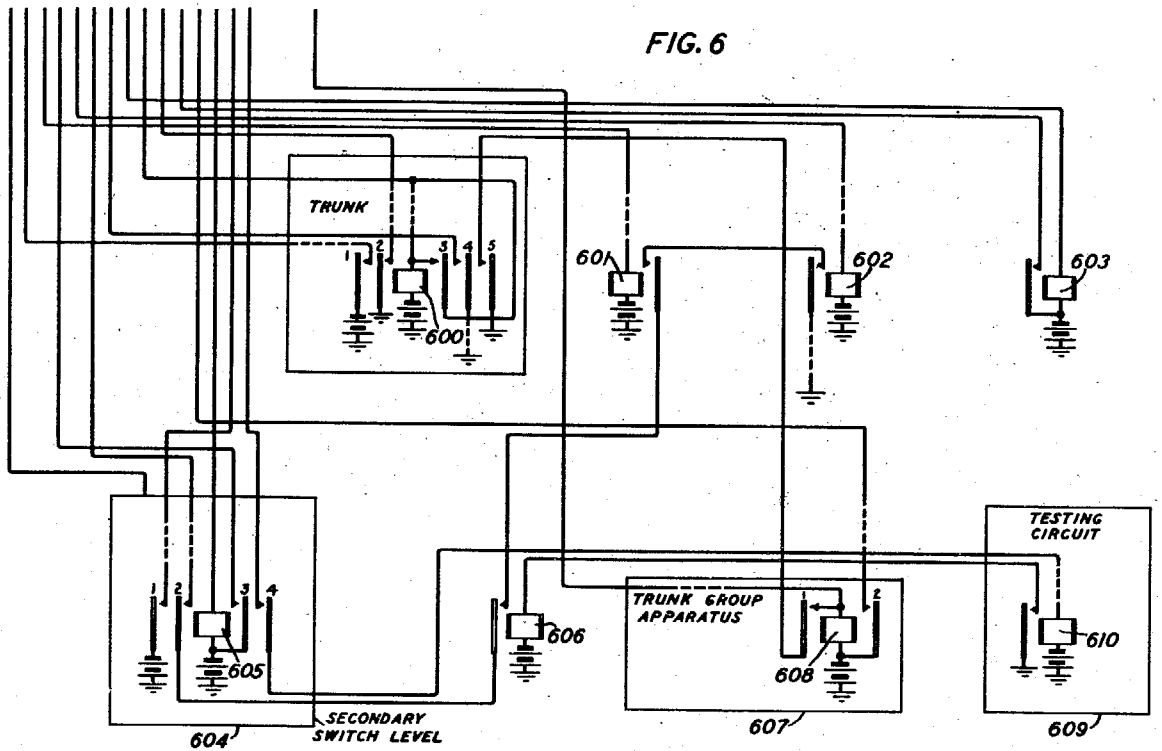
Figure 7:
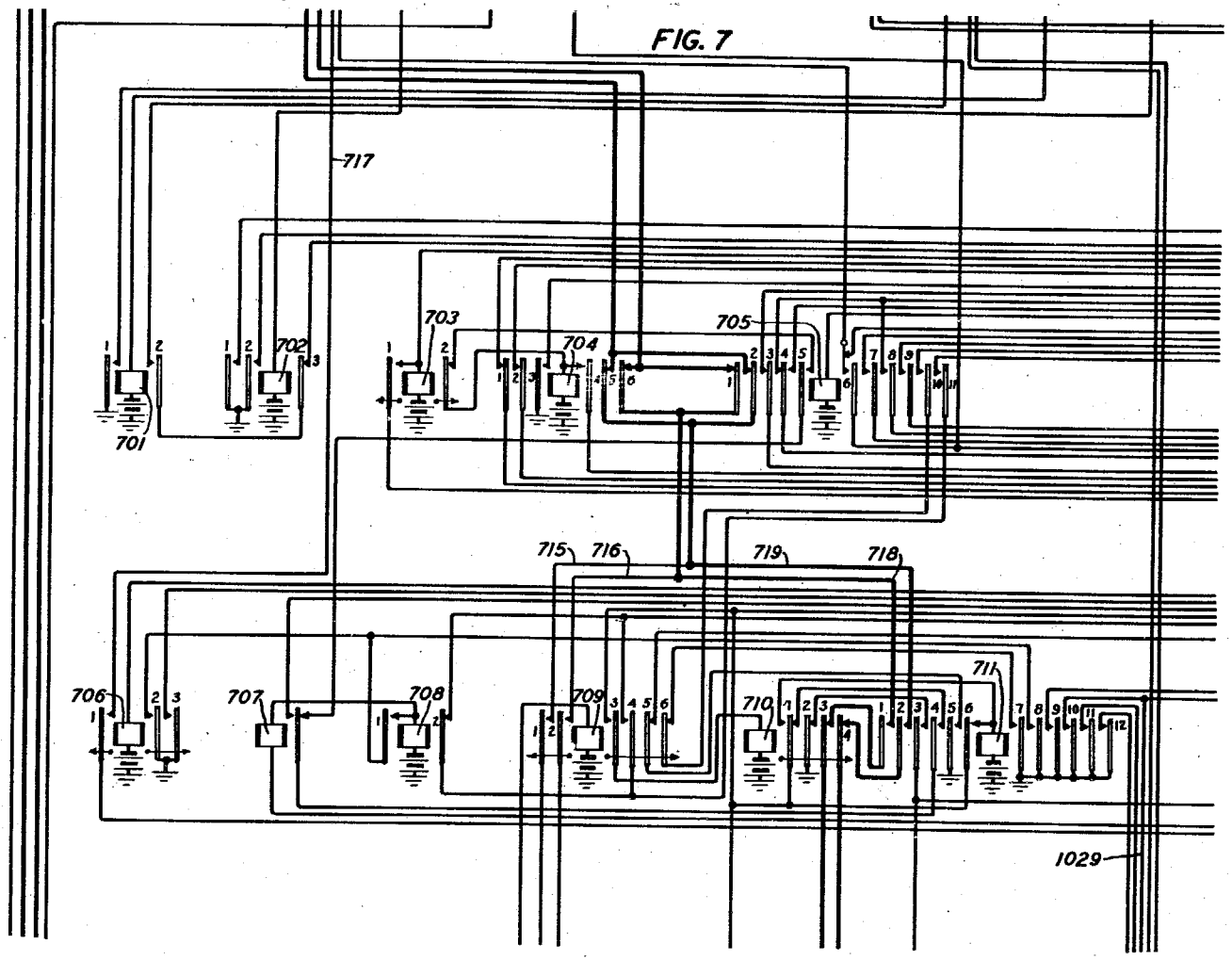
Figure 10:
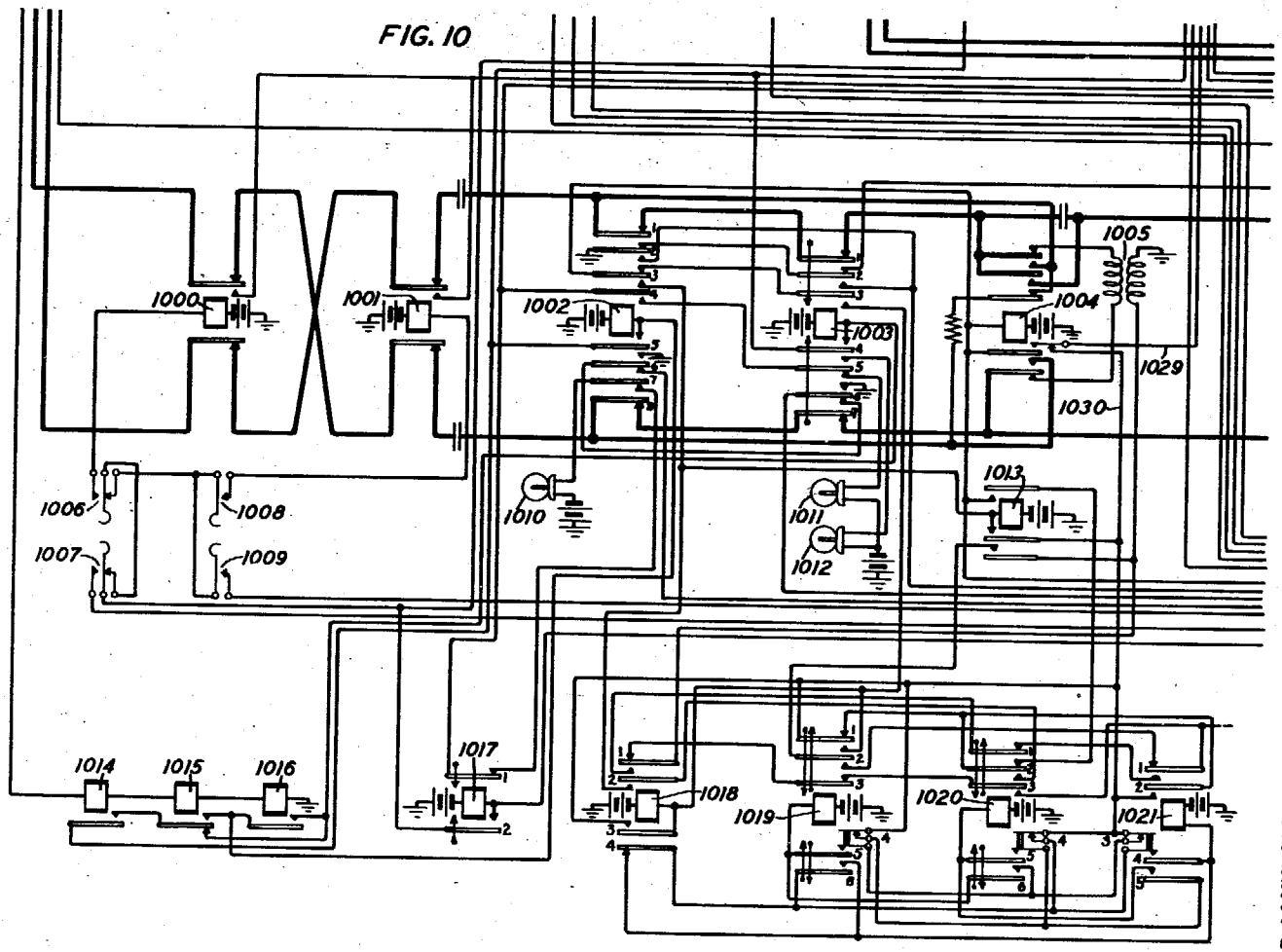

A call from a distant office actuates the apparatus of the receiving toll office by signals, which automatically energize the apparatus of a link for connecting the intertoll trunk such as disclosed in Figs. 1 and 2 with a cordless toll operator's position, such as disclosed in Figs. 7, 10 and 11. An idle link channel is chosen by the energization of the link-control circuit of Fig. 6 which selects an idle channel, Fig. 4, entering one of a plurality of cordless toll operators' positions. There are ordinarily a plurality of channels entering each position. Each channel is connected to a secondary link switch, such as switch 302 or 303. These are interconnected to a plurality of primary link switches available to the calling incoming trunks. By means of cross-wiring these secondary switches may be associated through one of a plurality of primary switches with the calling incoming trunk thus an idle channel of a position may be actuated by the link-control circuit, Fig. 6, and connected by this link-control circuit through a secondary and primary link switch which are also actuated by the link-control circuit. The operation of the link switches connects the apparatus of the channel with the apparatus of the calling incoming trunk circuit causing the energizing of apparatus in both the channel circuit and the calling incoming trunk circuit. The energization of this apparatus is successively interacting which adjusts the incoming intertoll trunk circuit, Figs. 1 and 2, and adjusts the apparatus of the channel, Fig. 4, and the position apparatus, Figs. 7, 10 and 11, for successive cooperative signals. The apparatus of the channel and position circuit is adjusted for receiving class of trunk line signals from the incoming trunk circuit. The incoming trunk circuit is adjusted for transmitting these signals. The operation of the position apparatus progresses to a point where signals are given to the cordless toll operator including a tone signal to indicate to this operator the character of call to be answered.

Figure 5:
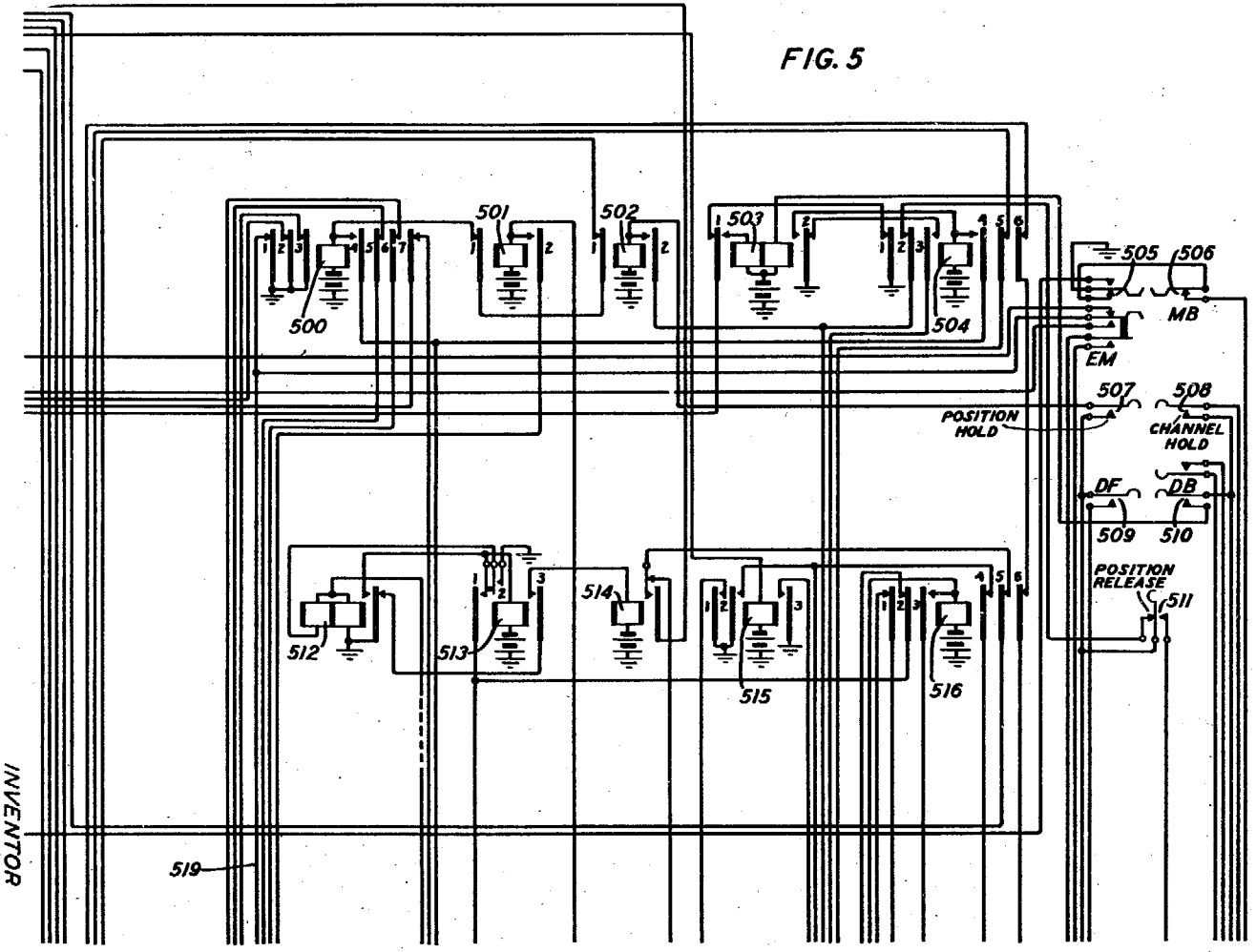
Figs. 5 and 8 illustrate a cordless toll position control circuit.
Figure 8:
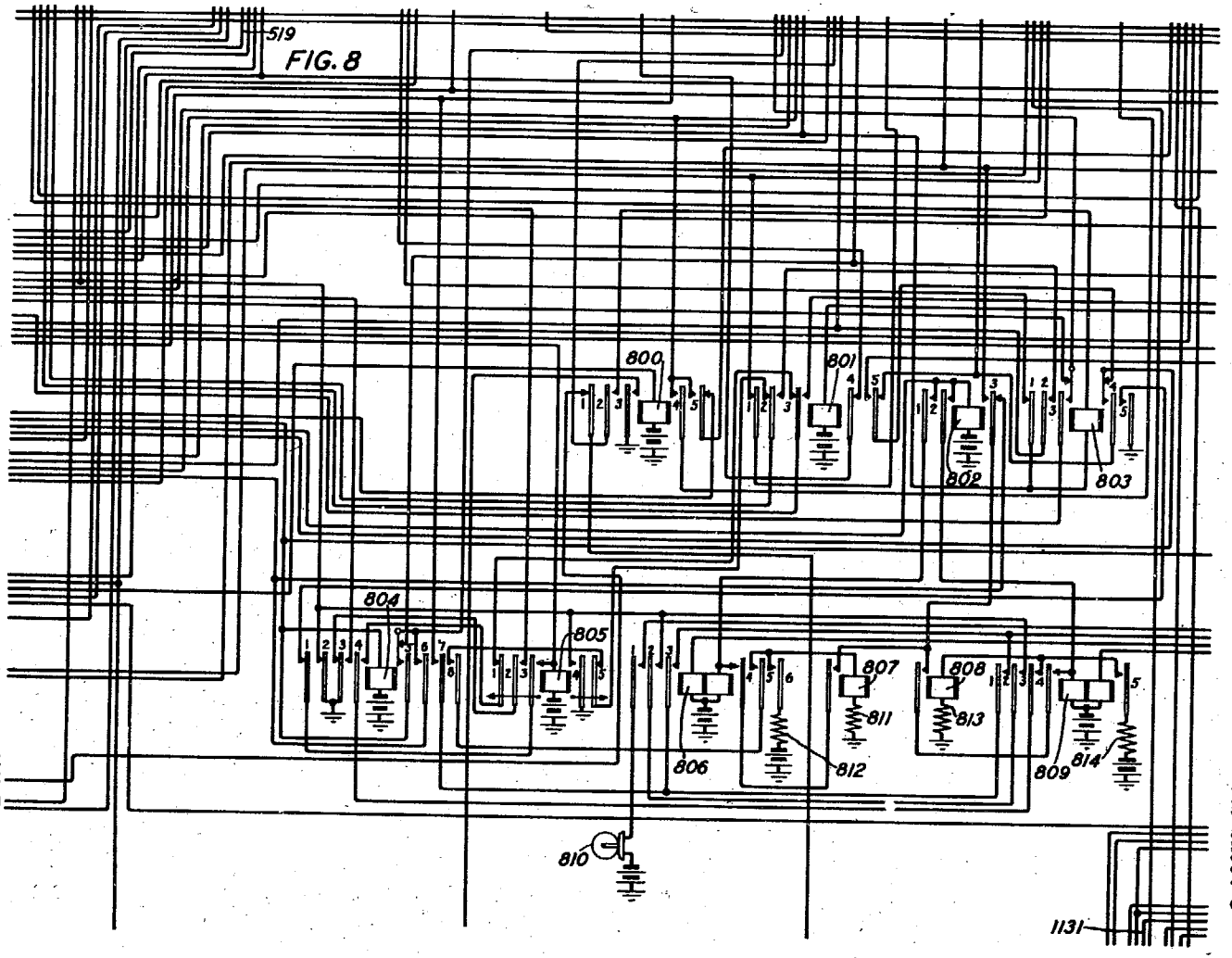

The apparatus of the position control circuit, Figs. 5 and 8, is energized including a start circuit for the sender 900. Registrations are made in the sender by the cordless toll operator according to code designations given to her by the calling party at station 100. The sender energizes a marker connector 901 for associating an idle marker therewith which receives code registrations from the sender covering the distant toll office or station to which the call should be routed, the character of the trunk lines, the class of the call and the character and class of the incoming trunk line. The registrations are used for selecting an outgoing trunk of a particular routing having the characteristics required for the type line connection to be made.

Circuit combinations are made in the marker by apparatus operated in accordance with the foregoing registrations which control operations in the sender and the position control circuit when the marker is in the process of releasing. The circuits energized determine whether a link and channel is to be connected between the incoming trunk and position channel apparatus for the duration of the telephone conversation or whether this apparatus shall be released. When supervision is to be maintained over a telephone connection during the period of conversation, circuits are established in the position control circuit for energizing a particular relay in the incoming trunk circuit. The energization of the latter relay establishes a locking path for the link and a locking path for particular apparatus in one channel of the position which is associated with this link connection. The position channel and the link is thus locked for maintaining supervision of the telephone connection. Energization of apparatus in the position control circuit by a circuit combination in the marker also energizes a relay in the incoming trunk when no supervision is required. In this case the channel and link switches are released and may be associated with other incoming trunks for serving other incoming calls. When the link is locked to a channel, only one relay in the channel is kept operated for associating signal paths between the position and the incoming trunk circuit so that the toll operator's position signals may be actuated at any time when either the calling or called parties require the attention of the cordless toll operator. When the link is not locked to a channel, the relay operated in the incoming trunk permits either the calling or the called party to operate an idle link to signal an idle operator.

In addition to the arrangement for locking a link and channel automatically from the marker, a second arrangement is used for locking the link and channel manually by the energization of a position key which energizes relays accomplishing the result manually which is accomplished automatically by the marker. The actual locking of the link is only accomplished after the marker has completed the selection of the outgoing trunk and set the switches for the connection between this outgoing trunk and the incoming trunk. As before, the marker in the process of releasing energizes apparatus which completes circuits for locking the link by the energization of particular relays in the position control circuits. This manner of locking the link manually is placed under the control of the marker in order that apparatus operations take place in proper sequence.

Detail Description

In the present disclosure the distant office 100 is connected to the automatically operable toll office illustrated in the drawings Figs. 1 to 11, inclusive, by a ringdown intertoll trunk which is energized by transmitting ringing current from office 100 over conductors 135 and 136 to the incoming trunk, Figs. 1 and 2. After the distant operator in office 100 has completed setting apparatus for the connection, this ringing current is applied automatically or manually to conductors 135 and 136 which is transmitted through the winding of alternating current relay 103 energizing this relay. The energization of relay 103 releases relay 104 which is normally energized from battery through its winding to ground on the contact of relay 103. The release of relay 104 establishes a circuit for operating the incoming trunk relay 202 over a circuit from battery through the winding of relay 202, contact 2 of relay 104, contact 7 of relay 117, contact 6 of relay 203 to ground. Relay 202 in operating establishes a locking circuit for itself through its contact 3, contact 7 of relay 117 to ground through contact 6 of relay 203. When ringing current is disengaged from the trunk conductors 135 and 136, relay 103 releases which reenergizes relay 104. A circuit is thus established for relay 113 from battery through its winding, contact 5 of relay 112, contact 2 of relay 104, contact 3 of relay 202, contact 7 of relay 117, contact 6 of relay 203 to ground. Relay 113 is locked through contact 4 of relay 201, contact 5 of relay 113 to its operating ground on contact 6 of relay 203. The operation of relay 113 now establishes a start circuit for a link which associated the incoming trunk and the operator at office 100 with the cordless operator whose telephone apparatus is shown in Fig. 11 of this disclosure. This link-start circuit may be traced from ground on contact 1 of relay 114 through contact 2 of relay 113, contact 1 of relay 112, lead 320, contact of relay 312, winding of link-start relay 311 to battery. The link-connector and link-control circuit is shown diagrammatically and reference is made to the patent application to King et al. Serial No. 295,010, filed September 15, 1939, issued as Patent No. 2,236,246, March 25, 1941, or the patent application to Busch et al. Serial No. 295,012, filed September 15, 1939, for a complete disclosure of this link-connector and link-control circuit.

*Link connector*

Figure 3:
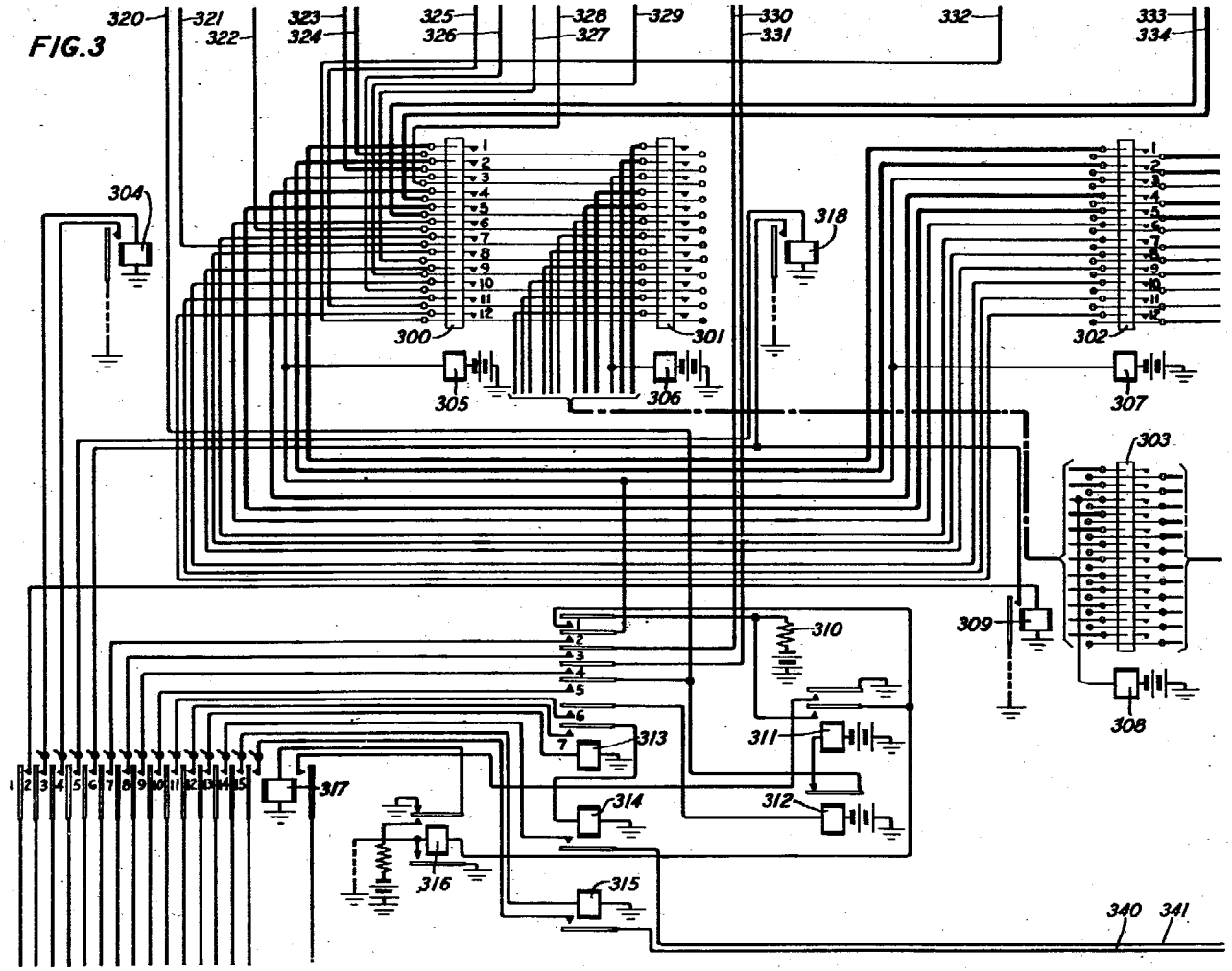
Fig. 3 illustrates a link and a connector for connecting calling incoming trunks and link switches to a link-control circuit shown in Fig. 6.
Figure 4:
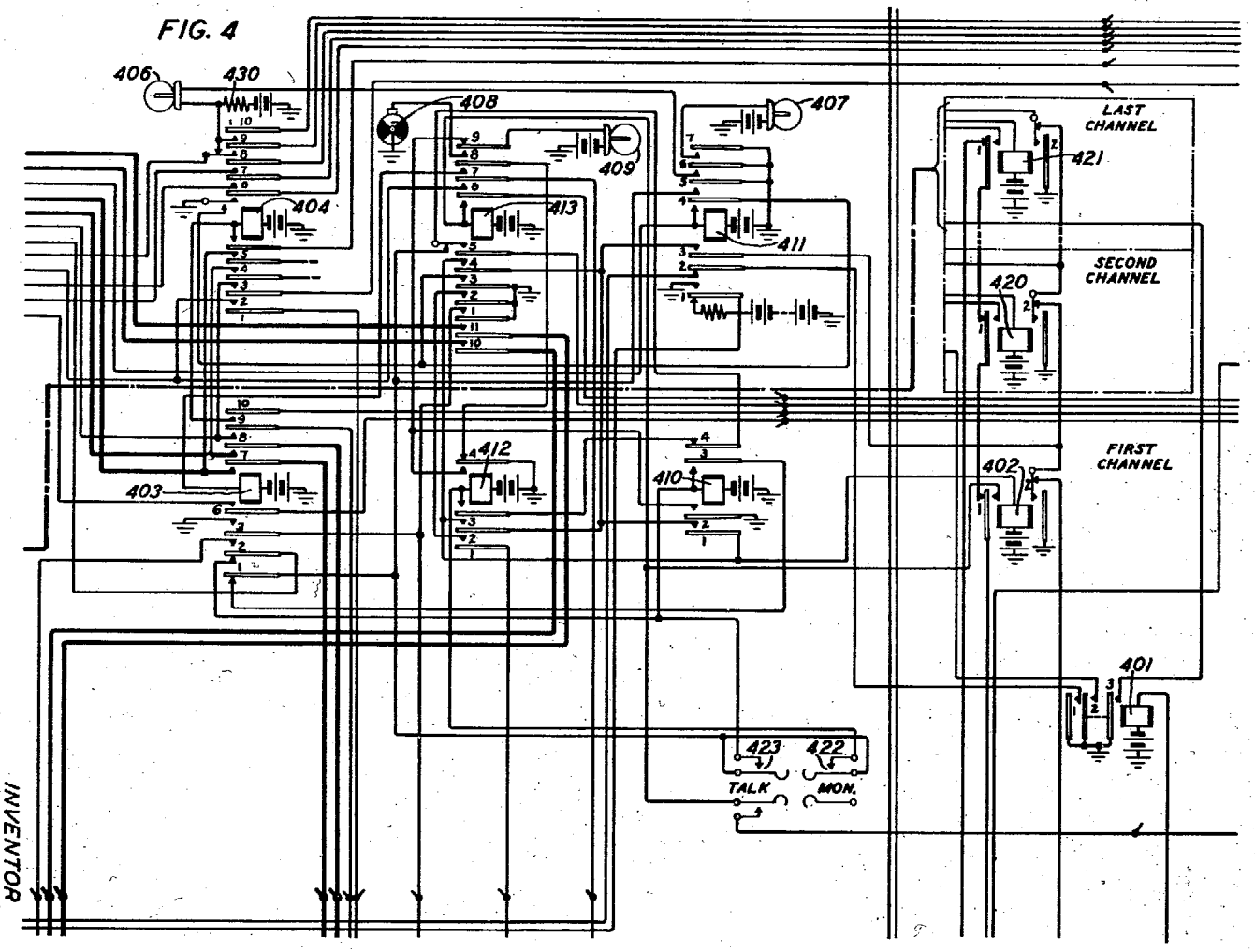
Fig. 4 illustrates the operator's position channels.

The energization of the link-start relay 311 establishes an obvious circuit for a link-connector selecting relay 316 which operates a multicontact relay such as 317 for connecting a large number of leads from an idle link-control circuit, Fig. 6, to the incoming trunk circuit, Fig. 1 and Fig. 2, to a plurality of toll positions, Fig. 4, and to a plurality of switches, Fig. 3. There are a plurality of link-control circuits, Fig. 6, which are small compared to the large number of switches, Fig. 3, and the large number of position channels, Fig. 4. Consequently, as noted in the aforementioned patent applications, it is necessary for a link connector to find an idle link-control circuit before operating the multicontact relay 317 to connect these different units together. The switches 300 and 301 represent a single horizontal level in two verticals of a primary link cross-bar switch connected to an incoming trunk circuit. Switches 302 and 303 are known as secondary switches of which there are a large plurality connected to a large plurality of channels in a plurality of cordless toll positions. The ones shown are different horizontal levels on different verticals of the same or different cross-bar switches. The function of the link-control circuit is to test a plurality of channels associated with a plurality of cordless toll positions to obtain an idle channel and the services of the toll operator in the cordless position to which this channel is connected. In view of the fact that each channel is connected to a different horizontal level of secondary switches, such as 302 and 303, the test of the channel determines the secondary switch to be used. Each incoming trunk appears on at least one horizontal level of a primary link switch which may be reached from different secondary link switches through different verticals on this primary link switch. The hold magnets for the primary and secondary switches, which constitute a channel, are connected in multiple as shown and operate together. An idle channel in a position having an operator in attendance has battery on lead 340 and ground on lead 341. Ground is placed on lead 341 by the operation of relay 401 actuated when relay 701 is actuated. Relay 701 is only actuated when an operator is serving the cordless position. The circuit for relay 701 may, thus, be traced from battery through its winding, contact 1 of individual channel relays 421, 420 and 402 normal, jack 1104 which has its contact closed when the telephone operator's headset plug 1106 is inserted therein, key 505, to ground on contact 1 of relay 500. Relay 401 has as many contacts thereon as there are channels in the position and, therefore, its operation makes all channels idle which are not in use. The release of this relay makes all channels busy. This will be seen from the description of the channel apparatus.

*Link and link-control circuit*

The link-control circuit, Fig. 6, is used for selecting an idle channel from a large plurality of channels entering cordless toll positions. The control circuit is associated with channels which are connected to certain levels of the secondary cross-bar switches shown in the right-hand portion of Fig. 3. These control circuits are in an incoming group arranged to serve the calling incoming trunks for testing the channels of the position and operating switches which connect a calling incoming trunk with an idle channel. The operation of start relay 311 establishes circuits for energizing a connector unit for controlling the association of a calling incoming trunk with an idle link-control circuit. The switches 300 and 301 comprise a portion of a primary link switch. Each switch of this character ordinarily has ten separate levels and a large plurality of verticals. In this instance only one is shown which is arranged to connect the calling incoming trunk to a secondary switch by the operation of a select magnet and a hold magnet. In practice the incoming trunk may be associated with various secondary switches 302 and 303 through a number of different verticals on the primary switch, making a large plurality of choices of apparatus for extending a call from the incoming trunk to the apparatus of the channels in the toll office switchboard. The secondary switches 302 and 303 may be on a single cross-bar switch or on separate cross-bar switches depending upon the choice of connection which is best suited for use. The secondary switch points shown may therefore be considered as one level of any vertical on a single cross-bar switch or one level of a vertical on any of a plurality of cross-bar switches.

The multicontact relay 313 and the multicontact relay 317 and the relays shown in the lower portion of Fig. 3 constitute an arrangement for giving an incoming trunk a plurality of choices in obtaining the services of a link-control circuit, Fig. 6, which may be associated therewith by the operation of the multicontact relay 317. The control circuit associated with a relay, such as 317, must test idle before it is seized. There are a plurality of multicontact relays 313 for each incoming trunk circuit. This plurality of relays are connected to a plurality of relays 317 which are interconnected when strapped as shown. There are a plurality of relays, such as 317, for each connector extending between the contacts of relays 313 and 317. Each control circuit has a representative relay in each connector so that any one of the control circuits may be associated when idle with any of the connectors between a group of trunks and the control circuits. The operation of start relay 311 by a circuit as previously established from the incoming trunk initiates the selection of an idle control circuit. A circuit is first established from battery through resistance 310, contact of start relay 311, winding of relay 316 to ground where a chain of relays, such as 316, is used to prevent the actuation of a connector by more than one trunk and for the selection of an idle control circuit. When the control circuits associated with such relays are busy no circuit is established for the relay. The energization of relay 316 establishes an operating circuit for the multicontact relay 317 for seizing an idle link-control circuit.

As previously stated the organization of the link switching arrangement and the control circuit is such that a choice is made from a large number of channels. In some instances a number of idle channels are simultaneously associated with the control circuit and only one of these is selected. The selection is made by a chain circuit in a secondary switch level selecting circuit 604 in which there are a plurality of relays equivalent to the number of channels which are tested. Relay 605 represents one channel. This relay, however, represents a switch combination associated with different channels, such as secondary switch 302 and primary switch 300 or secondary switch 303 and primary switch 301, each combination being associated with a different channel. In the same manner a plurality of verticals on the primary switch are connected to verticals on a plurality of secondary link switches. The verticals of the secondary link switches each have a plurality of horizontal levels connected to different position channels. The hold magnet on the vertical of the primary link switch and the hold magnet on a vertical of a secondary link switch are in multiple so that they may be operated simultaneously. The operation of any of the relays 605 indicates that they are associated with an idle channel and the preferred idle channel in the chain of relays, such as 605, is taken for the connection. In practice there are as many contacts on relay 314 of the connector as channels which are connected to the control circuit, Fig. 6. These relays are operated for associating the channel equipment with the control circuit to energize apparatus of the control circuit for selecting the idle channel and for making a test of this idle channel through the contacts of relay 315. This latter test is actually a secondary or double test to make sure that the channel is not seized by another control circuit immediately after it has been found idle by the control circuit being described. The operation of any particular relay, such as 605, determines the secondary switch level to which the idle channel selected is connected and, consequently, the control circuit may energize the switch combination of primary and secondary switches for connecting the incoming trunk to the channel selected.

A group of links and link-control circuits serve a plurality of groups of trunks which may be known as subgroups of trunks within the larger group. When a particular trunk within a subgroup of trunks actuates a link circuit, it is necessary to identify the subgroup with which it is associated. The link-control circuit is therefore provided with a plurality of relays 608 equivalent to the number of trunk subgroups served through the contacts of the associated connector relays. In this instance it may be assumed that a circuit is established for the group relay 608 to show the subgroup of trunks requiring service. A circuit is now established for relay 313 belonging to this subgroup. There are a plurality of trunks in each subgroup served by the same start relay 311. These are represented in the control circuit by a plurality of relays, such as relay 600. It will be remembered that a start ground was placed on conductor 320 of the incoming trunk when the start circuit was established. This ground operated relay 311 but at the same time extends ground through a plurality of contacts on relay 312 and a plurality of contacts on relay 313. There are as many contacts on relay 312 and 313 as there are trunks in a subgroup. This plurality of contacts is represented by one contact on relay 312 and contact 5 on relay 313. There are as many trunk relays 600 as there are trunks in the subgroup, all of which are initially operated from the start ground extending through one of the contacts on relay 312 and relay 313. The operation of these relays associates ground through a chain circuit, such as shown on contact 2 of relay 600, contact 6 of relay 313, winding of relay 312 to battery. The energization of relay 312 releases the start relay 311 and opens the leads from all trunks except the calling incoming trunk. The start ground therefore extends through only one contact of relay 313 through the winding of a relay 600 representing the calling incoming trunk. This relay remains operated and the relays associated with the other trunks are released. Relay 600 locks over the operating circuit traced to the start ground. The operation of the relay establishes the level of a primary switch to which the incoming trunk is connected and immediately establishes a circuit for the select magnet 304 for this level of the primary switch. This circuit may be traced from battery through contact 1 of relay 600, contact 2 of relay 317, winding of select magnet 304 to ground. The operation of select magnet 304 connects ground through its contact and through contact 3 of relay 317, winding of control circuit relay 601 to battery energizing the latter relay. The operation of relay 600 now establishes a circuit to determine the class of service required by the incoming trunk. This class of service is determined by the operation of one of a plurality of relays, such as relay 603, in the control circuit. Since, in this case, only one class is required, a circuit is shown established for relay 603 through the apparatus of the incoming trunk circuit. This circuit may be traced from ground through contact 4 of relay 600, contact 7 of relay 317, contact 3 of relay 313, conductor 330, contact 9 of relay 202 of the incoming trunk circuit which is operated thence over lead 331, contact 4 of relay 313, contact 8 of relay 317, winding of class relay 603 to battery. The operation of this relay connects battery through its contact, contact 11 of relay 317, contact 7 of relay 313, winding of relay 314 to ground. As previously stated there are as many contacts on relay 314 as there are channels associated with the control circuit. An idle control circuit establishes circuits for one or more relays, such as 605, in the control circuit. This circuit may be traced from battery through the winding of relay 605, contact 13 of relay 317, contact of relay 314, lead 341, contact 2 of relay 411 to ground on contact 1 of relay 401. The establishment of this circuit indicates an idle channel in a switchboard position attended by an operator since, as previously described, relay 401 is only operated when the operator is attending the switchboard position circuits. The operation of relay 605 establishes a circuit for operating the double test relay 315 as shown from battery through contact 1 of relay 605, contact 14 of relay 317, winding of relay 315, to ground. Since relay 605 is individual to the idle channel selected, the testing circuit of the control circuit is applied to the apparatus of this channel. This testing circuit comprises delicate apparatus which may operate if two control circuits are associated with the same channel. This testing circuit has been limited to relay 610 which is now associated with the idle channel over a circuit from 24-volt battery through its winding, contact 4 of relay 605, contact 15 of relay 317, contact of relay 315, lead 340 to 48-volt battery connected with contact 1 of channel relay 411. The operation of relay 605 also establishes a circuit for the select magnet associated with the level of the secondary switch connected to this idle channel. This circuit may be traced from battery through contact 3 of relay 605, contact 4 of relay 317 through ground through the select magnet 318. The operation of the select magnet connects ground through its contact, contact 5 of relay 317, relay 602 to battery. The operation of relay 610 indicates that no interference has been encountered in the selection of the idle channel and establishes a circuit for relay 606. All of the elements to be used have now been tested and the mechanism associated therewith energized. The operation of the select magnets of the primary and secondary switches energizes relays 601 and 602. The test of the channel associated with the secondary switch was made by the energized relay 606. A circuit may therefore be established at this time for energizing the hold magnets of this switch combination for connecting the incoming trunk with the selected channel. This circuit may be traced from ground through the contacts of relays 602 and 601, contact of relay 606, contact 2 of relay 605, contact 6 of relay 317, contact 2 of relay 313, to battery through the hold magnets 305 and 307. The operation of the secondary switch 302 establishes a circuit for channel relay 411 from battery through its winding, contact 3 of switch 302, contact 2 of relay 313 thence through contact 6 of relay 317, contact 2 of relay 605, contacts of relays 606, 601 and 602 to ground. A circuit is also established for relay 410 from battery through its winding, contact 2 of relay 403, contact 7 of switch 302, contact 7 of switch 300, lead 321, contact 2 of relay 112, to ground through contact 1 of relay 113. The operation of relay 411 disassociates 48-volt battery from the testing circuit lead 340 and connects ground therewith. This causes a reversal in the testing circuit of the control circuit releasing relay 610 which is necessary for the release of the control circuit. The operation of relay 411 removes ground from the test lead 341 and this lead now remains open. This causes the release of relay 605 in the control circuit which enters into the release of the control circuit. This control circuit will now be released as soon as the trunk start circuit is opened.

*Position channel*

The operation of relay 411 establishes obvious circuits for lighting the busy lamp 407 and the guard lamp 406. Relay 410 establishes an obvious circuit for lighting guard lamp 409. The operation of both relays 410 and 411 establishes a circuit for energizing the channel preference relay 402. There are as many relays, such as 402, as there are channels in a cordless position. These relays, such as 402, 420 and 421, are in a chain circuit to prevent seizure of more than one channel at a time or seizure of one channel in a position when another channel is connected to the operator's headset. The operating circuit for relay 402 may be traced from battery through its winding, contact 1 of talking relay 410, contact 3 of relay 411, contact 2 of relay 402, contact 1 of relay 701 to ground. Other operating circuits for relay 402 are also established through contact 2 of the monitoring relay 412 when operated or through contact 4 of the backward relay 413 when the latter relay is operated. Relay 402 in operating establishes a locking circuit for itself from battery through its winding, contact 1 of relay 410, contact 3 of relay 411 to ground through its contact 2. This relay also opens the operating circuit for relay 701 extending through its contact 1 and establishes a circuit for relay 413. The circuit for relay 413 may be traced from battery through its winding, contact 1 of relay 402, contact of the operator's jack 1104, contact of emergency key 505, contact 1 of backward release relay 500 to ground. The release of relay 701 opens a circuit for relay 401 to cause its release so that all channels of the position are made busy during the period required by the operator in serving a call entering her position. This includes supervising operations, such as talking to either a calling or a called party or monitoring as explained later. The operation of relay 413 establishes a circuit for operating relay 403 from ground through contact 4 of relay 412, contact 8 of relay 413, winding of relay 403 to battery. Relay 413 also alters the guard lamp 409 from a steady to a flashing condition by the connection of ground from interrupter 408 through the lamp filament. This flashing signal indicates to the position operator that an incoming trunk has been connected to an idle channel of the position as a preparatory signal in advance of a tone signal given to the operator a fraction of second later. Relay 413 establishes a locking circuit for relay 411 and a holding ground circuit through its contact 3 and contact 4 of relay 411 for the hold magnets 305 and 307. The switches 300 and 302 are, therefore, no longer dependent upon the link-control circuit for maintaining their holding circuit. The operation of relay 403 closes circuit paths for the talking and signaling conductors from the trunk through the contacts of the link switches to the cordless position apparatus, opens the locking circuit for relay 410 which restores to normal and closes an operating path for relay 404. The circuit for relay 404 is established from ground on contact 2 of relay 804 in the position control circuit, contact 3 of relay 705, contact 1 of relay 803, contact 7 of relay 500, contact 10 of relay 403, winding of relay 404 to battery. The latter relay locks to its operating ground. The operation of relay 403 now energizes relay 112 in the incoming trunk circuit for opening the link-start circuit extending to relay 600 of the link-control circuit. The circuit for relay 112 may be traced from ground on contact 1 of relay 504, contact 1 of relay 503, contact 6 of relay 403, contact 12 of switches 302 and 300, lead 332, contact 2 of relay 117, contact 3 and the winding of relay 112 to battery. Relay 112 establishes a locking circuit for itself to ground on contact 6 of relay 203 over a circuit including contact 4 of relay 113, contact 2 of relay 104, contact 3 of relay 202 and contact 7 of relay 117. The operation of relay 112 removes the start ground from lead 320 which extended through its contact 1 and causes the release of relay 600 in the link-control circuit. The release of relay 600 causes the release of relay 608 which releases relay 313. The release of relay 313 opens the locking circuit for relay 316 which releases and, in so doing, releases relay 317. The release of relays 313 and 317 opens the circuit of all relays in link-connector and link-control circuits. The link connector and link-control circuits may now serve other calls entering the telephone office. As previously stated, a ground is supplied from the position circuit for maintaining the hold magnets 305 and 307 operated and, therefore, the switch connection between the position channel and the trunk remains established.

*Class of trunk signals*

The operation of the previously described relay 413 in one of the channels connects ground from its contact 1 through the winding of position relay 702 to battery. The operation of the latter relay connects ground through its contact 2, contact 5 of relay 500, contact 1 of the class relays 1117 and 1119 to battery through the winding of class relay 709. Relay 709 operates and connects leads 715 and 716 through its contacts 1 and 2 to the windings of class relays 1121, 1122, 1123 and 1124 to battery through resistances 1125 and 1126, respectively, thus starting class determination. The ground from contact 2 of relay 702 also extends through contact 5 of relay 500, contact 3 of relay 709, winding of relay 710 to battery. Relay 710 opens leads 718 and 719 extending to the operator's telephone circuit and establishes an operating circuit for relay 711 which may be traced from battery through the winding of relay 711, contact 1 of relay 710, contact 5 of relay 500, contact 2 of relay 702 to ground. Relay 711, in operating, establishes a locking circuit through its contact 6 to the operating ground. The class signals are transmitted to the position circuit in order that the position sender and the marker may be guided by the character of incoming intertoll trunk connected therewith. The incoming trunks which are connected to the cordless position for toll or terminating connections may be of the ringdown or straightforward type from distant toll offices or from tandem offices and they may vary in transmission characteristics. For example, a via intertoll outgoing trunk must be selected by the marker for a call from a distant toll office which shall be routed outgoing to another toll office. On the other hand, if a call is for a connection which may extend from one toll office to this toll office and is terminated in a local subscriber's station, it is not necessary to use a toll trunk of the equivalent transmission characteristics as used for the via connection. There are also trunks which are of these characteristics in so far as transmission qualities are concerned but which have different signaling devices, such as the difference in signals between the straightforward intertoll trunk and the ringdown intertoll trunk. The class signal in each case indicates the character of the trunk by associating a grounded circuit which may or may not have resistance in series therewith and open circuits in various combinations with the class relays. These are connected from the trunk circuit, Fig. 2, through the contacts of relay 201 or a similar relay in a different intertoll trunk circuit over leads 333 and 334 through the cross-bar switches of Fig. 3, contacts 7 and 8 of relay 403 to the class relays 1121, 1122, 1123 and 1124. These relays are marginal and, consequently, operate according to the resistance in series with the energizing circuit. The following are examples of some combinations that are made. If a grounded resistance is connected to lead 333 and lead 334 remains open, relay 1121 operates which energizes relay 1117. The latter relay is operated from battery through its winding, contact of relay 1121 to ground on contact 11 of relay 711. Relay 1117 when operated locks to this operating ground. When lead 333 is connected directly to ground with no resistance in series therewith, relays 1121 and 1122 are operated which causes the operation of relays 1117 and 1118, both locking to ground on contact 11 of relay 711. The same combination is used where lead 334 is either connected directly to ground or grounded resistance which operates relay 1123 in one case and both relays 1123 and 1124 in the other case. This causes the operation of either relay 1119 or both relays 1119 and 1120 which lock in the same manner as described for relays 1117 and 1118. Varied combinations are used throughout to indicate the characteristics of the different trunks. These indications are later transmitted to the sender and marker and are used for establishing circuits as will later be described.

*Splitting relay*

It will be noted that when any class determination is made the operating path for class relay 709 is opened by the operation of either relay 1117 or 1119, thus causing the release of relay 709. This relay is slow to release to allow time for class determination. The release of relay 709 operates relay 706 and releases relay 710. The circuit for relay 706 may be traced from ground through contact 5 of relay 711, contact 5 of relay 709, contact 6 of relay 500 to battery through the winding of relay 706. During the foregoing operations a check is made for the sleeve holding ground provided by the incoming trunk circuit when relay 202 was operated as previously described. If this ground has been properly associated with the sleeve lead, a circuit is established for relay 708 which may be traced from battery through the windings of relays 708 and 707 in series, contact 6 of relay 504, contact 6 of relay 516, contact 5 of relay 801, contact 4 of relay 803, contact 7 of relay 413, contact 9 of the link switches, Fig. 3, thence over lead 329 through contact 9 of relay 201 and contact 4 of relay 202 to ground. Relay 708 is locked to ground on contact 8 of relay 711. This holding ground later serves to hold the switch hold magnets operated on a connection which has been established when the splitting relay 201 is operated for talking to the called party. Relay 707 is a polarized relay and does not operate unless the circuit traced is associated with a connection which has already been established. If this circuit is associated with an established connection, battery through the switch hold magnets will operate relay 707 to ground on contact 8 of relay 711 or to ground on contact 2 of relay 706. When this relay is energized a circuit is established for relay 800 through the contact of relay 707, contact 4 of relay 711, contact 2 of relay 710, contact 5 of relay 500 to ground on contact 2 of relay 702. The operation of relay 800 supplies ground to the position circuit for lighting lamp 1010 to show that the position is associated with an established connection. Relay 707 is also used in connection with the release of the position apparatus. The operation of relay 706 over the circuit previously established associated ground with lead 717 to operate the splitting relay 201 of the incoming trunk over a circuit which may be traced from ground on contact 3 of relay 500 through contact 1 of relay 706, lead 717, contact 9 of relay 403, contact 6 of switches 302 and 300, contact 4 of relay 112, winding of relay 201 to battery. Relay 201 in operating establishes a holding circuit for relay 113 from battery through its winding, contact 4 of relay 201, thence to the operating ground for relay 201. Relay 113 remains operated after the release of relay 201 over a circuit traced from battery through the winding of relay 113, continuity contact of relay 201, contact 5 of relay 113, contact 2 of relay 104, contact 3 of relay 202, contact 7 of relay 117, contact 6 of relay 203 to ground. This splitting relay 201 is released when conversation between the operator and the calling operator has ceased and part of the position apparatus is released. At this time, however, the splitting relay 201 is operated to disassociate the inward and forward ends of the trunk and associate the forward end with the cordless position circuit for signaling purposes and for conversation between the operators. The forward relay, such as 404, of the position channel is operated if no other forward relay in the sequence circuit is operated. A circuit for this relay is established as described when the backward relays 403 and 413 of the channel operate. Relay 404 establishes a circuit for relay 515 over an obvious circuit and the latter relay establishes a circuit for relay 705 which ties the forward and backward portions of the position circuit together for service on the same call. The circuit for relay 705 may be traced from ground through contact 3 of relay 515, contact 3 of relay 803, winding of relay 705 to battery.

*Position signals*

An arrangement of signals is provided which are operated by relay combinations in the position circuit under the control ringdown incoming intertoll trunk circuits, Figs. 1 and 2, or incoming intertoll trunks of other connections which have apparatus responsive to different signals transmitted over the toll lines or trunks. The operation of apparatus in the incoming trunk circuit under different conditions connects battery to different values of resistance over lead 321 to the position circuit. This lead 321 may be traced to the position circuit through contacts 7 of the link switches 300 and 302, contact 2 of relay 403 and thence through the windings of marginal relays 1014, 1015 and 1016 to ground. The number of these relays operated depends upon the value of resistance associated therewith responsive to calls of different character. For example, when a call is a new call or connection to an outgoing toll trunk, relay 112 is operated which associated resistance 110 in circuit with relays 1014, 1015 and 1016. The value of resistance 110 is such that only relay 1014 is operated. This establishes a circuit for relay 1003 from battery through its winding, normal contact of relay 1015, contact of relay 1014 which is operated to ground. This indicates that the call to be answered by the cordless operator is a new call. In this case the apparatus of the position toll circuit will establish a circuit for relay 1017. In the case of a recall from the calling distant operator, the same circuit will be established with the exception of the circuit for relay 1017. In the case of a recall, relay 800 in the position control circuit is operated and there will be no circuit for relay 1017. Therefore, on a recall a circuit is established to light lamp 1010 and a distinctive tone is transmitted to indicate this type of call. When a manual recall is made from a called office, circuits are established for relays 112, 207 and 204 of the incoming trunk circuit, Figs. 1 and 2. The operation of the above three relays connects resistances 222 and 110 in multiple and these multiple resistances are connected in series circuit with relays 1014, 1015 and 1016. The value of resistance 222 in multiple with resistance 110 is such as to cause the operation of relays 1014 and 1015. The operation of both relays 1014 and 1015 establishes an obvious circuit for relay 1002 which lights lamp 1011 and associates a distinctive tone with the operator's headset. A different signal is given when the distant called party does not answer. In this case, incoming trunk relays 112 and 207 are operated which connects resistances 221 and 110 in series with relays 1014, 1015 and 1016. The value of resistance 221 in multiple with resistance 110 is such as to cause the operation of all of the above relays. The operation of these three relays establishes an obvious circuit for both relays 1002 and 1003 which lights lamp 1012 through their contacts and establishes a circuit for a distinctive tone.

The tone circuit, known as the order tone, for indicating to the operator that a particular connection has been established which is either a new call, a recall or that the connection desired has not been established. This tone circuit is established by the operation of relays shown in the left portion of Fig. 10 over the control relays 1014, 1015, 1016, 1002 and 1003. The operation of either relays 1002 or 1003 indicates to the position operator that the incoming call is from a ringdown intertoll trunk and also establishes a characteristic circuit to the marker. With these relays released circuits are established for indicating that the call is from a straightforward intertoll trunk. In the case where both relays are released, three pulses of order tone are transmitted to both the distant operator and the cordless operator. When only one of the above relays is operated, the tone will be transmitted only to the cordless operator. One pulse of tone is transmitted when relay 1002 is operated and two pulses of tone are transmitted when relay 1003 is operated.

*Position tone circuit*

The order tone circuit is established from the position control circuit which associated ground with lead 1029 through contact 4 of relay 1004, lead 1030, contact 4 of relay 1020, contact 4 of relay 1018, winding of relay 1021 to battery. Relay 1021 is the first of a series of operations for energizing and deenergizing the tone circuit. This tone circuit may be traced from tone source 1022 through various contacts of relays 1013, 1018, 1019, 1020 and 1021, thence through the right winding of tone transformer 1005 to ground. The tone is transmitted by induction through tone transformer 1005, contacts 1 and 5 of relay 1004 to the talking conductors which in one case extend through contacts 1 and 4 of relay 1101 and the windings of transformer 1102 by induction to the cordless operator's headset. As previously stated, on certain calls the tone is transmitted only to this cordless operator but when a call is transmitted over a straightforward intertoll trunk, relays 1002 and 1003 are both released and the tone is transmitted through contacts 1 and 7 of relay 1003, contacts 1 and 8 of relay 1002, thence to the contacts of relays 1001 and 1000, contacts 10 and 11 of relay 413 to the trunk conductors.

The sequence of operations of the tone relays is as follows: Relay 1021 operates to ground on conductor 1030. As previously traced, the operation of this relay establishes a circuit for relay 1020 to the same ground through contact 5 of relay 1021 and contact 4 of relay 1019. The operation of relay 1020 closes the tone circuit through its contact 3 from the tone source 1022 and the tone coil 1005. Relay 1020 locks through its contact 5 and contact 4 of relay 1019 which opens the operating circuit for relay 1021 and the latter relay releases. A circuit is thus established for relay 1019 through contact 6 of relay 1020 and contact 3 of relay 1021. The operation of relay 1019 opens the tone circuit for ending the first impulse of tone. The circuit for relay 1020 is opened by the operation of relay 1019 causing its release. A circuit is now established for relay 1018 through contact 1 of relay 1019 and a locking circuit is established through its contact 3. This sequence of events again establishes an operating circuit for relay 1021 through contact 6 of relay 1019 and contact 4 of relay 1020. A second impulse of tone is started by again closing the tone circuit through contact 1 of relay 1021, normal, contact 1 of relay 1020, contact 1 of relay 1018, which is operated, and through coil 1005 to ground. The circuit of relay 1019 was opened by the operation of relay 1021 and releases. A circuit is thus established for relay 1020 which is the same as the circuit over which it was previously operated. A circuit is also established for relay 1013 through contact 2 of relay 1018, which is held locked, contact 2 of relay 1020 and contact 1 of relay 1019 to the original ground as traced. Relay 1013 locks to this same ground. The operation of relay 1020 opens the circuit for relay 1021, causing its release and opening the tone circuit which ends the second pulse of tone. A circuit is now established for relay 1019 which circuit is the same as previously established for this relay. This closes the tone circuit for a third impulse of tone and opens the circuit for relay 1020. This is the last tone circuit established and may be traced from the tone source 1022 through contact 1 of relay 1021, contact 2 of relay 1019, contact 3 of relay 1013, winding of the tone coil 1005 to ground. A relay 1021 is now energized through contact 6 of relay 1019, contact 4 of relay 1020, over leads 1030 and 1029 to the original ground. The operation of relay 1021 opens the tone circuit and terminates the third impulse of tone and also establishes a circuit for relay 1004 through contact 1 of relay 1013, contact 2 of relay 1020, contact 2 of relay 1021 to the original ground. Relay 1004 in operating establishes a locking circuit for itself through its contact 4 to ground over lead 1029. The operation of relay 1004 separates leads 1029 and 1030 at its contact 4, thus releasing all of the relays which were held to this ground including 1013, 1018 and 1021.

The foregoing describes the operation of the tone circuit for transmitting three tones which is the maximum used in this circuit arrangement. As previously explained, three tones are used when the toll call is incoming over a straightforward trunk and may indicate a new call over this trunk or a recall by the originating-distant operator. A call from an originating operator over an incoming ringdown trunk actuates relay 1003 either when this call is a new call or when it is a recall from the originating operator. A recall from the called party operates relay 1002 and the called party does not answer both relays 1002 and 1003 but relay 1002 is the only one effecting the control of the tone circuit. Under the condition of a new call or a recall from the originating operator, using an incoming ringdown intertoll trunk, the operation of relay 1003 causes one pulse to be transmitted to the cordless operator. The talking circuit to the incoming trunk is opened to contacts 1 and 7 of relay 1003 and thus this one pulse does not reach the incoming trunk. The operation of relay 1003 establishes a circuit for relay 1004 after one pulse has been transmitted. This circuit may be traced from battery through the winding of relay 1004, contact 3 of relay 1002 which is normal, contact 3 of relay 1003 operated, contact 1 of relay 1019 which is operated at this time, and thence to ground over leads 1030 and 1029 through contact 4 of relay 1004. Relay 1004 in operating separates leads 1030 and 1029 and locks through its contact 4 to lead 1029. As previously stated, the operation of relay 1004 releases the tone actuating relays and ends the transmission of tone after one pulse. The operation of relay 1002 on a recall from a called toll office or information operator's desk causes the transmission of two pulses to the cordless operator. These pulses do not reach the incoming and outgoing trunks. The operation of the tone circuit relays proceed as previously described until relay 1020 operates a second time. A circuit is thus established for relay 1004 from battery through its winding, inside contact 3 of relay 1002, contact 2 of relay 1018, contact 2 of relay 1020, contact 2 of relay 1021 to ground over lead 1030. Relay 1004 opens the tone circuit as previously described and locks through its contact 4 to lead 1029.

The foregoing indicates the action in the cordless toll operator's position circuit both for a new call entering this position as previously described, and for a recall from a distant operator. It is assumed for this description that the distant toll operator in toll office 100 requests a connection to an operator in a distant toll office over a via intertoll trunk and, consequently, the apparatus of the sender 900 and the marker 901 must be actuated in a manner to actuate the cross-bar switches 282 and 285 for connecting the incoming intertoll trunk, Figs. 1 and 2, with an outgoing trunk 280 extending to office 281, disclosed diagrammatically in the right portion of Fig. 2. Reference is made to the Patent 2,236,246 to King, McKim, Myers, March 25, 1941, for a complete description of the cordless toll position equipment, position control circuit, position sender 900 and marker 901 for operating the apparatus of this office to complete the connection between the incoming intertoll trunk and the outgoing trunk. In order to simplify this description, only the parts which are involved in carrying out the operation of this invention are disclosed and described.

*Sender*

During the foregoing operations which provide a signal to the operator indicating a call has entered the position and the character of the incoming call, a circuit is established for the sender start relay 704 as soon as certain relays are in the following position: Relay 702 operated, relay 500 released, relay 710 released, relay 711 operated, relay 707 released, relay 705 operated, and relay 703 released. The positioning of the foregoing relays was established as previously described. The circuit for the sender start relay 704 may therefore be traced from ground through contact 2 of relay 702, contact 5 of relay 500, contact 1 of relay 710, contact 4 of relay 711, contact of relay 707, contact 5 of relay 705, contact 2 of relay 703, winding of relay 704 to battery. Relay 704 locks through contact 1 of relay 516, contact 5 of position release relay 804 to ground through contact 2 of relay 515 which was operated by relay 404. The operation of the sender start relay 704 establishes an operating circuit for sender control relay 925 in the sender 900 from ground through contact 3 of relay 704, winding of relay 925 to battery. Relay 925 operates relay 703 from battery through its winding, contact 2 of relay 516, contact of relay 925 to ground. Relay 703 locks to this same ground through its contact 1. The operation of the latter relay opens the operation path for the sender start relay 704 which now remains operated under the control of its locking circuit which extends through the position release relay 804. Relay 703 is slow in operation to guard against too rapid seizure of the sender.

The elements of the position sender may be roughly divided with respect to their functions into principal parts, the key-set, the register circuit, the connector control circuit for associating the connector between the sender and the marker and control relays for establishing circuits through the connector to the marker for controlling the operations of the apparatus in the marker, all of which is diagrammatically shown as sender 900.

The position sender is now in readiness to receive registrations from the position circuit. The cordless toll operator upon observing a lamp signal and receiving a tone signal indicating the type call to be answered challenges the distant operator which in this case is a toll operator at toll office 100 and receives the code or code and numerical designation of a wanted party. In certain cases where the connection to another distant toll office is desired only the code number is given to the cordless toll operator. When a call incoming from another toll office terminates in the area of the toll office receiving the call, the code designation and numerical designation may be given by the calling toll operator so that a telephone connection can be completed in this area by the cordless toll operator. A large variety of combinations of interconnections between incoming trunks of various character and outgoing trunks of various character are provided. For this reason numerous combinations of call registrations are required both for indicating the character of the calling incoming trunk and the character of the outgoing trunk required for completing the connection. Only sufficient apparatus combinations are shown to carry out the operating circuits of the invention.

The cordless toll operator manipulates the keys of the position key-set for energizing registers in the sender. These registrations in the sender are transferred to the marker after the energization of a marker connector 901 by the sender which associates the sender with an idle marker. There are only a small plurality of markers by comparison with the plurality of senders in this character of toll office and consequently a marker connector is used for finding an idle marker and associating the sender which has been energized with this idle marker. Registrations are transferred to the marker covering the routing of this connection and the character of the calling incoming trunk circuit. This includes the character of the outgoing intertoll trunk to be used for the connection. The above registrations in the marker are used for completing the telephone connection and for controlling apparatus of the cordless toll position as soon as this connection has been made. This automatically adjusts the incoming trunk circuit to either arrange circuits for placing the telephone connection under the constant supervision of the cordless toll operator by locking the link switches of the channel or for indicating that this supervision is not required.

Call registrations were transferred to the marker from the class registers in the lower portion of position circuit, Fig. 11, for indicating the class of the incoming trunk by operating relays 911, 912 or 913. The operation of relay 912 signals the marker that the calling incoming trunk is a via incoming trunk of the highest transmission characteristic. The operation of relay 911 signals the marker that the calling incoming trunk is a terminal trunk. When relay 911 is energized the telephone connection may be extended either to a distant toll office and there terminated or it may be extended to a local office in the area of this toll office. An incoming call over a via intertoll trunk may terminate in a local office in the area of this toll office. In this case relay 912 will be energized to indicate an incoming call over a via intertoll trunk and also relay 913 will be energized by the coder registers to indicate the terminating area of the call. The energization of route relay 906, along with other apparatus not shown, is for a via connection to an intertoll trunk extending to another distant toll office. When the incoming intertoll trunk is a via intertoll trunk and the outgoing trunk is a via intertoll trunk the connection requires supervision and therefore the route relay energizes a class relay 908 which establishes a combined circuit for automatically locking a link between a position channel and the calling incoming trunk. This circuit, however, is not completed until the via outgoing trunk has been selected by the marker and the switching paths completed between this idle outgoing trunk and the calling incoming trunk.

The energization of relay 911 by the class relays and the energization of a route relay, such as route relay 907, establishes a circuit for relay 809 in the sender control circuit instead of relay 806. In this case the route relay energizes class relay 909. A circuit is thus established in the toll position after the connection is established for non-supervision of the connection. The energization of via relay 912, local relay 913 and the terminal route relay such as 907 also energizes a circuit for non-supervision of the connection established.

Assuming that route relay 907 identifies a manual terminating office, the operation of relay 909 also operates relay 501 to delay release of the position circuit and link until the cordless toll operator has passed the number of the wanted subscriber to the local operator and to place the release under the control of the cordless toll operator.

Calls to certain other offices cause the operation of a class relay which is similar in function to relay 909 but which does not operate relay 501. Under this condition the operator's position circuit and the link switches are released automatically by the release of the marker and sender.

*Via connection*

A via connection is completed between the toll office 100 through this office to a distant toll office 281 by the energization of a route relay such as 906, according to registrations set up by the operator in the sender which were transferred to the register 905 of the marker 902. The operation of this route relay causes the association of a group of trunks extending to office 281 with testing apparatus of the marker (not shown). This group of trunks is tested and an idle trunk selected extending to office 281. This may be assumed as trunk 280 which is diagrammatically shown. As soon as this trunk is selected the trunk relay 289 is energized by the application of ground from the marker. A switch indication is given to the marker covering the location of the switch associated with the calling incoming trunk and with the selected outgoing trunk and a path is found from the outgoing trunk switch 285 to switch 282 connected with the calling incoming trunk. After this path is found the switches are energized for connecting the incoming trunk with the outgoing trunk. The switch location signaled to the marker causes the energization of apparatus for the energization of the select magnets associated with these switches. The energization of select magnet 277 is made directly through the marker apparatus. The energization of select magnet 278 is accomplished through the energization of a relay such as relay 915 in the marker which must first readjust the position apparatus to connect the select magnet circuit with the marker. The operation of relay 915 establishes a circuit for relay 801 in the position control circuit for associating the select magnet with the marker. A circuit is then established from battery through contact 2 of relay 915, contact 3 of relay 801, contact 7 of relay 404, contact 10 of switches 302 and 300, contact 7 of relay 113, winding of select magnet 278 to ground. A circuit is then established in the marker for energizing the hold magnets of all switches involved in this connection such as hold magnets 275 and 276. A second circuit for the hold magnets is then established by the closure of the switch contacts over conductor 286 either from ground through contact 4 of relay 202 and contact 9 of relay 201 or over lead 329 from the position circuit as previously traced. This maintains the hold magnets in operation through the contacts of the switches after the marker has been released and also holds relay 289 operated after the marker has been released. After the above circuits have been completed a relay such as 251 in a link connector, associated with the marker, is energized which associates ground with relay 910 to signal the marker that the selection and test of the trunk and the operation of the switches have been properly completed. Relay 910 releass 915 which opens the circuit of the select magnets 277 and 278 and opens the energizing circuit for relay 801 which releases. The operation of relay 910 establishes in part a circuit for relay 914 which is completed as releasing circuits are established in the marker. The marker in the process of releasing energizes relay 914 which establishes a circuit for relay 926 in the sender 900, to provide a signal that the marker has completed its functions satisfactorily. If there are no further functions to be performed by the sender, the operation of these relays along with other relays will cause the release of the sender 900.

*Outgoing trunk*

The connection of the outgoing trunk through the switch contacts actuates the outgoing trunk by first operating relay 290 over the ring conductor. The circuit for this relay may be traced from battery through its winding and contact 1, winding of retardation coil 287, thence over the ring conductor of the cross-bar switches 285 and 282, retardation coil 224, contact 8 of relay 202, conductor 327, contact 8 of link switches 300 and 302, contact 9 of relay 404, contact 5 of relay 516, contact of relay 514, contact 4 of relay 801, right winding of relay 512 to ground. The right winding of relay 512 is of high resistance and relay 290 does not operate in the circuit traced. Relay 512 operates and in so doing establishes a circuit for relay 513. The operation of the latter relay associates ground through the left winding of relay 512 with the circuit traced through the winding of relay 290 to battery. Relay 290 now operates and locks through its contact 2 to ground on the contact of relay 289. The operation of relay 290 also opens the circuit established over the ring conductor, thus releasing relay 512. This establishes an obvious circuit for relay 514 from battery through its winding, contact 3 of relay 513 to ground on the contact of relay 512. The operation of relay 514 adjusts the circuit from the ring conductor of the outgoing trunk which extended through the link switches to contact 9 of relay 404. Traced from this point this lead now extends to contact 5 of relay 516, contact and armature of relay 514, contact 10 of relay 404, resistance 430 to battery. Lamp 405 is maintained lighted by a ground on contact 6 of relay 411 and the path just traced is for supervisory purposes to indicate to the cordless toll operator the response of the operator at distant office 281. The operation of relay 290 establishes a path for signaling the distant office. This path, however, may be the usual arrangement, which is not shown. When the operator at the distant office 281 responds, contacts are established through a circuit which is diagrammatically shown as contacts 291, 292 and coil 293. The closure of these contacts establishes a circuit for relay 288 which associates ground through contact 1 of relay 290 with the ring conductor of the trunk. This circuit is, as previously traced, through the winding of retardation coil 287 to contacts 8 of link switches 300 and 302 through contact 9 of relay 404, which extends through the contact of relay 514, as traced, contact 10 of relay 404 for shunting lamp 406. This lamp is extinguished to advise the toll operator that the connection has been completed and does not require further attention at this time. The association of ground through the contact of relay 288 also establishes a circuit for relay 209 in the incoming trunk circuit, which becomes effective when relays 113 and 201 release. This may be traced from ground through the contact of relay 288, contact 1 of relay 290, winding of retardation coil 287, thence over the ring conductor through the trunk connecting switches, retardation coil 224, contact 8 of relay 202, contact 9 of relay 113, contact 10 of relay 201, right winding of relay 209 to battery. This unbalances relay 209, which operates to interrupt the operation of a timing circuit 107 operated through the energization of relay 106. The timing circuit was originally started by the energization of relay 106 when relay 113 released, to measure a time interval before transmitting a signal to the operator that the called party did not answer. Relay 106 was energized over a circuit from 24-volt battery 140, through the winding of this relay, contact 3 of relay 102, contact 4 of relay 105, contact 2 of relay 209, contact 3 of relay 113 to ground on contact 3 of relay 114. Relay 106 locks through its contact 2 to establish a timing period which is sufficient for the operation of the trunk apparatus previously described to complete the telephone connection and for response at the terminating office. The operation of relay 209 opens the above circuit and now associates battery 140 through the winding of relay 106 with 48-volt battery 141 connected to contact 3 of relay 206. This circuit may be traced through contact 3 of relay 102, contact 4 of relay 105, contact 2 of relay 209 to 48-volt battery 141. This reverses the current in relay 106, causing its release, which causes the release of a number of relays in the timing circuit 107. After the timing relays have released, a circuit is against established through their contacts for relay 106 which now operates from 48-volt battery 141 to 24-volt battery 140. This starts a time period of a different duration than the first time period and causes the operation of relay 206 from battery through its winding, contact 3 of relay 209, contact 4 of relay 102, contact 3 of relay 106 to ground in the timing circuit. The operation of relay 206 disassociates the 48-volt battery from the operating circuit for relay 106, causing the release of relay 106. Relay 206 in operating establishes a locking circuit for itself through its contact 2 to ground either on contact 4 of relay 116 or contact 2 of relay 114. One of these relays or both of these relays have been operated by this time from a circuit established in the position apparatus. Relays 206 and 209 remain operated in order to maintain a supervisory path connected to the apparatus associated with the distant office 281. Relay 209 is also operated from battery through its winding, contact 1 of relay 204, contact 4 of relay 209, contact 8 of relay 113, to ground on contact 2 of relay 114 or contact 4 of relay 116.

*Control of link from marker*

It has been assumed that the calling incoming intertoll trunk is a via trunk and that the connection was made to a via outgoing toll trunk through the energization of the route relay 906. This route relay established the class of the outgoing trunk in the marker by energizing class relay 908. As previously stated the operation of the class relays in the lower portion of Fig. 11, when a via incoming trunk is registered, establishes a circuit for relay 912. This may be established by the operation of class relay 1117 which connects ground to lead 1131 which extends through the winding of relay 912 to battery. The operation of relay 912 and the operation of relay 908 fix the circuit combination for energizing apparatus in the position control circuit which causes a link to be locked between the incoming trunk and a position channel. The marker in the process of releasing, establishes this circuit from ground on contact 1 of relay 914, contact of relay 912, contact 2 of relay 911 normal, contact of relay 908, left winding of relay 806 to battery. Relay 806 establishes locking circuit for itself before its operating circuit from the marker is opened. As previously stated other combinations are made by the operation of the class relays in the lower portion of Fig. 11 which may energize relay 911 indicating that the calling incoming trunk is what is known as a terminal trunk. Route relay 907 of the marker, when operated, causes the selection of an idle terminal trunk. This route relay energizes the class relay 909. When relay 911 and relay 909 are energized the marker in the process of releasing establishes ground on contact 1 of relay 914, contact of relay 912, normal, contact 1 of relay 911, contact 3 of relay 909, right winding of relay 809 to battery. When the incoming trunk is a via trunk and the outgoing trunk is a trunk to a local office, relays 912, 913 and 909 will be operated to create a combination for energizing relay 809 from ground through contact 1 of relay 914, contact 1 of relay 912, contact 2 of relay 911, contact of relay 913, contact 2 of relay 909, right winding of relay 809 to battery. Relay 809 establishes circuits in the toll position for non-supervision of the connection established. In addition, relay 909 at contact 4 closes a circuit for relay 501 to delay the release of the position.

Relay 926 which is energized during the process of releasing the marker, establishes a circuit for energizing the position release relay 804 which may be traced from ground on contact of relay 926, winding of relay 804 to battery. Relay 804 establishes a locking circuit for either or both relays 806 and 809. The operation of relay 806 establishes a circuit from battery through resistance 812, winding of relay 807, resistance 811 to ground. The operation of relay 809 establishes a similar circuit for relay 808. Either relay operated connects a common locking circuit either through the right winding of relay 806 or the left winding of relay 809, whichever relay is operated. This locking circuit may be traced from battery through the locking windings and the associated contacts of relays 806 or 809, contact of relay 807 or 808 to the armature and contact 3 of relay 802. This relay is normal and therefore the circuit extends through contact 6 of relay 804 to ground on contact 2 of relay 515. These relays remain operated for controlling apparatus in the incoming trunk circuit over circuits which are completed upon the release of relay 113 in the incoming trunk and will be traced after the release of this relay. Relay 804 in operating establishes a locking circuit for itself from battery through its winding and contact 5 to ground on contact 2 of relay 515. Relay 804 opens the locking circuit of relay 805 which releases. Relay 804 establishes a circuit for relay 500 from ground through its contact 3, contact 4 of relay 705, contact 1 of relay 502, contact 1 of relay 501, winding of relay 500 to battery. Relay 500, in operating, locks to ground on contact 1 of relay 702. The operation of relay 500 opens the operating circuit for relay 112 but relay 112 is locked to ground on contact 6 of relay 203 and therefore does not release. At this time the splitting relay 201 is locked to ground at contact 6 of relay 203 which circuit may be traced from battery through the upper winding of relay 201, contact 5 of relay 201, contact 5 of relay 113, contact 2 of relay 104, contact 3 of relay 202, contact 7 of relay 117, contact 6 of relay 203 to ground. Relay 113 is locked to a contact of the splitting relay 201. This circuit for relay 113 may be traced from battery through its winding, contact 4 of relay 201, contact 4 of relay 112, lead 322, contact 6 of switches 300 and 302, and thence over two circuits, one established through contact 9 of relay 403 and the other established through contact 2 of relay 404. The circuit through contact 9 of relay 403 extends through contact 1 of relay 706 and contact 3 of relay 500 to ground. The circuit extended through contact 2 of relay 404 passes through contact 2 of relay 805 and contact 3 of relay 804 to ground. The operation of relays 804 and 500, therefore, opens the circuit for relay 113 which releases. Since the locking circuit for relay 201 extends through a contact of relay 113, relay 201 also releases. Relay 113 in releasing establishes the circuits for operating either or both relays 114 and 116. The circuit for both relays may be traced simultaneously from battery through their windings, contacts 6 and 7 of relay 113, contacts 10 and 11 of switches 300 and 302, contacts 7 and 8 of relay 404, contacts 2 and 3 of relay 801, contacts 1 and 5 of relay 805, contacts 4 and 8 of relay 804, contacts 5 and 6 of relay 806 and contacts 3 and 5 of relay 809. The circuit for relay 114 extends to ground through the winding of relay 807 and resistance 811 and the circuit for relay 116 extends to ground through the winding of relay 808 and resistance 813. A potentiometer is associated with each circuit, one comprising resistance 812 to battery and the winding of relay 807 and resistance 811 to ground. A similar potentiometer is associated with the circuit of relay 808. Relay 114 may be energized over the circuit traced through contacts 5 and 6 of relay 806. Relay 116 may be energized over the circuit traced through the contacts of relay 809.

Relay 114 when operated connects ground through its contact 1 with lead 328, contact 3 of switch 300, hold magnet 305 to battery, through the winding of the hold magnet 307 to battery and extends through contact 3 of switch 302, winding of relay 411 to battery. The link switches 300 and 302 and the relay 411, therefore, remain locked and lock the calling incoming trunk to the channel of the cordless toll operator's position. The operation of relay 114 also establishes circuits for signaling purposes in the incoming trunk, Figs. 1 and 2. Relay 116, when operated, establishes similar signaling circuits for the incoming trunk but does not establish a circuit for locking the link to a channel of the cordless position.

The cordless position apparatus proceeds in the process of releasing as follows: The original operating circuit for relay 404 is opened through contact 7 of relay 500. This original operating circuit for relay 404 places a shunt path around the winding of relay 803. This shunt is now removed and the operating circuit for relay 404 extends through the winding of relay 803 which now operates to ground on contact 4 of the slow-release relay 805. The operating circuit for relay 706 is opened through contact 6 of relay 500. Relay 706 is slow release to maintain a locking circuit for relay 413. The operating circuit for relay 413 is opened through contact 1 of relay 500 but since relay 413 has a locking circuit to ground on contact 3 of the slow-release relay 706 over lead 519, it remains operated until relay 706 releases. The locking circuit for relay 711 is opened by contact 5 of relay 500. The operating circuit for trunk splitting relay 201 is opened by contact 3 of relay 500. Contact 2 is arranged to open the circuit for the monitoring relay 412 when it is operated. This relay is only operated when a monitoring key 422 is actuated as later described. The operation of relay 803 previously traced opens the circuit for relay 705 which releases. The release of relay 705 opens the circuit for the slow-release relay 805. The ultimate release of relay 805 opens the holding circuit for relays 404 and 803 which releases relay 515. The ultimate release of relay 706 opens the locking circuit for relay 413 which now releases. The release of relay 413 opens the circuit for relay 403. Relay 702 is held operated to ground on relay 413 and relay 403. When both have released this causes the release of relay 702 which opens the locking circuit for relay 500. The release of relay 413 also opens the circuit for the channel relay 402. The position circuit has now been fully released and the channel circuit has been released with the exception of relay 411 which is locked to the incoming trunk circuit, Figs. 1 and 2, by the operation of a relay such as 114, assuming that the latter relay was automatically energized by the marker in response to registrations as described. The toll position may now be seized for new incoming calls which may be connected to idle channels of the position or may be taken for use by distant toll operators or subscribers over an established connection.

In the case of a call directed to a manual terminal office, resulting in the operation of class relay 909 and relays 809, 808 and 501 as above described, the circuit of relay 500 is opened at contact 1 of relay 501 and the operation of relay 804 during the release of the marker 902 and sender 900 is ineffective to release the operator's position. However, relay 804 opens the locking circuit of relay 704 and that relay releases to complete a talking circuit between the toll operator's position and the operator's position at the manual office. With relay 704 released, relay 501 is locked in a circuit from battery through its winding and contact 2, contact 2 of relay 704, contact 2 of relay 504, contact of position release key 511 to ground at contact 9 of relay 711.

The toll operator may now pass the number of the wanted line to the operator at the manual office, after which she operates key 511 to release relay 501 and permit relay 500 to operate under the control of relay 804. Further release takes place as above described, relay 116 being operated in the trunk circuit.

In the case where the class relay operates relay 806 but does not operate relay 501, release takes place as for the locked link except that, since relay 116 is operated in the incoming trunk circuit, relay 411 is not held operated and the link switches release with the position and channel circuits.

*Control of link from toll position*

Relays 114 and 116 of the incoming trunk circuit may also be operated at the will of the cordless position operator by the energization of the channel hold key 508. This key establishes a circuit for the channel hold relay 802 which may be traced from battery through the winding of relay 802, contact 7 of relay 705, contact of key 508, contact 2 of relay 1003 to ground or contact 2 of relay 1002 to ground. The operation of relay 802 connects this ground through the right winding of relay 806 to battery and the left winding of relay 809 to battery which operates both relays 806 and 809. Relay 804 is then either automatically operated during the release of the marker as previously explained or is operated by the actuation of position release key 511. The latter circuit for relay 804 may be traced from battery through its winding, contact 8 of relay 705, contact 4 of relay 800, contact of key 511 to ground on contact 9 of relay 711. The operation of relay 804 now establishes circuits for both relays 114 and 116 as previously traced. When both relays 114 and 116 are operated locking circuit for the hold magnet of the link switches and relay 411 of the position channel is established from ground through contact 1 of relay 114 as previously traced. As previously traced the operation of relay 804 energizes relay 500 for opening the circuit for relay 113 causing its release. The release of relay 113 establishes a circuit in the incoming trunk for operating both relays 114 and 116. The release of the position and channel apparatus proceeds as previously described. Relay 411 of this channel remains locked to the link and incoming trunk circuit for supervision of the telephone connection established.

*Supervision by cordless toll operator*

Let it now be assumed that after the connection was established, the distant operator at office 281, requires the attention of the cordless toll operator and that the incoming trunk, Figs. 1 and 2, is locked to a channel in the cordless toll position by link switches 300 and 302 and that, therefore, relay 411 is operated and relay 114 operated for holding this position channel. The distant operator when requiring the attention of the cordless toll operator may open and close the contacts 291 and 292 a number of times which is known as flashing. The flash of the distant operator in the first opening of the contacts 291 and 292 releases relay 288 and disassociates ground from the lower winding of retardation coil 287 over the ring conductor, thus causing the release of relay 209. Relay 204 is operated from battery through its left winding, contact 2 of relay 208, contact 4 of relay 209, contact 8 of relay 113 to ground on contact 2 of relay 114. With relay 204 operated, when relay 209 reoperates in response to the reclosure of contacts 291 and 292, a circuit is completed for relay 207 from battery through its winding, contact 1 of relay 116, contact 1 of relay 208, contact 1 of relay 204, contact 4 of relay 209, contact 8 of relay 113 to ground at contact 2 of relay 114. Both relays 204 and 207 are locked through contact 4 of relay 208 to ground on contact 2 of relay 114. The operation of relay 207 opens the locking circuit for relay 112, which releases. The release of relay 112 reestablishes the local operating circuit for relay 113 as previously traced to ground on contact 6 of relay 203. Relays 204 and 207 are slow to release and establish new locking circuits upon the release of relay 113 which may be traced from battery through the tight winding of relay 204 and from battery through the winding of relay 207 thence through contact 3 of relay 113 and contact 3 of relay 114 to ground. The locking circuit for relay 208 is opened by the operation of relay 113 causing the release of relay 208 so that relays 204 and 207 may later be released when relay 113 is again released. Relay 114 being operated prevents reestablishment of the start circuit for a new link. The operation of relay 113 and the release of relay 112 automatically establishes a circuit for the talking relay 410 in the channel circuit. This circuit may be traced from ground on contact 1 of relay 113, contact 2 of relay 112, lead 321, contact 7 of switches 300 and 302, contact 2 of relay 403, which at this time is normal, winding of relay 410 to battery. As soon as relay 403 operates following the energization of the talking relay 410 a circuit is reestablished for relay 112 through contact 6 of relay 403 to ground on contact 1 of relay 504. Relay 112 reoperates and associates the signaling path over lead 321 with the operator's position. The operation of relays 204 and 207 establishes a circuit from battery through resistance 222, contact 4 of relay 204, contact 2 of relay 207 in multiple with battery through resistance 110, joining this circuit to contact 2 of relay 112, lead 321, contacts 7 of switches 300 and 302, contact 2 of relay 403, windings of relays 1014, 1015 and 1016 to ground. The operation of relays 1014 and 1016 establishes a circuit for relay 1002 as previously traced. A circuit is established for lamp 1011 and a characteristic tone is transmitted to the operator as previously described, indicating to the operator the character of call to be answered. The apparatus of the channel and position circuit, including relay 403, is energized in the following manner.

Following the operation of talking relay 410 a circuit is established for the channel relay 402 which is operated in order to prevent seizure of the position during this supervision of an established connection. The circuit for the channel relay 402 may be traced from battery through its winding, contact 1 of relay 410, contact 3 of relay 411, contact 2 of relay 402 to ground on contact 1 of relay 701. A circuit is thus established for relay 413 from battery through its winding, contact 1 of relay 402, contact of the telephone jack 1104, contact of key 505 to ground on contact 1 of relay 500. Relay 413 is later locked to ground on contact 3 of relay 706 after the operation of relay 706. At this time a circuit is established for relays 403 and 404 as previously traced which establishes the foregoing circuit for relay 112 and causes the operation of relays 515, 705 and relay 702. Relays 709, 710 and 711 are again operated as previously traced. Relay 711 locks to ground on relay 500. Relay 709 is released by the operation of either class relay 1117 or 1119 which causes the release of relay 710. A circuit is then established for the operation of relay 706 from battery through its winding, contact 6 of relay 500, contact 5 of relay 709 to ground on contact 5 of relay 711.

A circuit is now established for relays 708 and 707. In this case both operate to indicate an established connection. This circuit may be traced from battery through the windings of relays 708 and 707 in series, contact 6 of relay 504, contact 6 of relay 516, contact 5 of relay 801, contact 4 of relay 803, contact 7 of relay 413, contact 9 of the link switches, Fig. 3, thence over lead 329 to contact 9 of relay 201 and contact 4 of relay 202 to ground and to the sleeve conductor of the switches through the holding magnets to battery. Relay 708 is energized to ground on contact 4 of relay 202. The energization of relay 708 establishes a locking circuit for itself to ground on contact 8 of relay 711 and also to ground on contact 2 of relay 706. This establishes a circuit for the polarized relay 707 from ground on the locking circuit for relay 708 through the winding of relay 707 to battery connected to the hold magnets of the switches. A circuit is thus established for relay 800 from battery through its winding contact of relay 707, contact 4 of relay 711, contact 2 of relay 710, contact 5 of relay 500, contact 2 of relay 702 to ground. The operation of relay 707 prevents the establishment of a circuit for the sender start relay 704 as previously traced and thus the sender is not moved off normal under this condition. The talking conductor extending to the contacts of relay 704 remain closed and the operator's telephone set is associated with the line when the splitting relay is energized. This splitting relay 201 is energized by the association of ground with conductor 717 when relay 706 is operated as previously described. The ground is established for the splitting relay through contact 3 of relay 500, contact 1 of relay 706, lead 717, contact 9 of relay 403, thence through the incoming trunk to the winding of relay 201 to battery. The incoming conductors from the toll office 100 are disassociated from the outgoing trunk so that the cordless toll operator can converse with the operator in office 281. After the conversation the cordless toll operator may energize release key 511 to release the apparatus of the cordless toll position in the manner previously described. In this case the release of relay 113 opens the locking circuits for relays 207 and 204 both of which release. Relay 411 of the channel still remains operated and the channel remains connected to the incoming trunk as before.

An established connection may also be supervised by the operation of the talking key 423 which operates relay 410 for connecting the cordless toll operator's headset with the trunk line in the manner above described.

In the case of a recall by the operator at a manual office, in which case the link was not locked to the trunk, the operator flashes, releasing and reoperating relay 209 as above described. Relay 112 is released and relay 113 reoperated. However, since in this case relay 116 is operated, the previously traced start circuit from ground at contact 1 of relay 114, over contact 2 of relay 113 and contact 1 of relay 112 to start conductor 320 is again closed and the link control circuit of Fig. 6 functions to select an idle channel at an idle position as on a new call. However, relay 707 operates to indicate the presence of an established connection as described above for supervision on a locked channel. Relay 707 operates relay 800. With relay 800 operated the subsequent operation of the release key 511 operates relay 804 to complete the release of the position.

*Monitoring*

When the operator chooses to monitor on an established connection, key 422 is energized for operating relay 412. The circuit for this relay may be traced from battery through its winding, contact of key 422, contact 5 of relay 411 to ground. The energization of the monitoring relay establishes a circuit for the channel relay 402 and for monitoring relay 1101. The circuit for relay 402 may be traced from battery through its winding, contact 2 of the monitoring relay 412, contact 3 of relay 411, contact 2 of relay 402, contact 1 of relay 701 to ground. The circuit for relay 1101 is obvious and need not be traced. Relay 413 is energized from battery through its winding contact 1 of relay 402, contact 1104 of the telephone jack, contact of key 505 to ground on contact 1 of relay 500. Relay 403 is not energized during monitoring and thus no circuit is established for relay 404. The circuit for relay 403 is opened by contact 4 of relay 412. The monitoring circuit extends from the tip and ring conductors of the incoming trunk through contacts 1 and 2 of switches 300 and 302, contacts of relay 413, directly to the monitoring portion of the telephone circuit, Fig. 11. During monitoring the position apparatus including relays 402, 401, 701, 702, 709, 710, 711, 707, 708, 800 and 706 are operated as before in order to energize other apparatus for placing the relays of the position circuit in such order as to properly establish releasing circuits when the monitoring is completed. Circuits are not established for relays 515 and 705. The release of the circuit upon the completion of monitoring may be accomplished by the operation of key 511 which operates relay 500 from battery through its winding, contact 1 of relay 501, contact 1 of relay 502, contact 4 of relay 705 normal, contact 4 of relay 800, contact of key 511, contact 9 of relay 711 to ground.

At the end of a telephone conversation the circuits involved in the connection are released by the opening of the trunk circuit at a distant office or a subscriber's station. Relay 288 is released which removes ground from the circuit traced through the winding of retardation coil 287 over the ring conductor to the winding of relay 209. Relay 209 releases and under this condition remains released. A circuit is established for the timing circuit which operates relay 106 over a circuit as previously traced which after a time period releases the apparatus of the incoming trunk if a link is not locked thereto. Assuming that a link is not locked and consequently relay 114 is normal, a circuit is established for relay 117 from battery through its winding, contact 5 of relay 114, contact 4 of relay 206, contact 3 of relay 209, contact 4 of relay 102, contact 3 of timing relay 106 to ground in the timing circuit. The operation of relay 117 now opens the locking circuit for relay 202 which extended through contact 7 of relay 117. The release of relay 202 removes ground from the sleeve conductor 286 causing the release of the switch hold magnets and the release of relay 289 in the outgoing trunk. The release of relay 289 causes the release of relay 290 which restores the outgoing trunk to normal. The release of relay 202 restores all of the apparatus in the incoming trunk to normal.

When the incoming trunk is locked to link switches, such as 300 and 302, and a channel in the cordless toll position, a disconnect at the distant office causes relay 209 to release which transmits a signal to the cordless operator and operates relay 207 in the manner previously described. A disconnect signal is thus given to the cordless operator by the operation of relay 410 from ground on contact 1 of relay 113 after the release of relay 112 and the reoperation of relay 113 as described for a recall of the cordless toll operator. Relays 503 and 504 are now operated to release the apparatus of the incoming trunk circuit. The cordless operator energizes key 510 establishing a circuit for relay 503 from battery through its right winding, lower contact of key 510 to ground on contact 2 of relay 1002 which is operated. Relay 503 in operating establishes an obvious circuit for the operation of relay 504. Relay 504 opens the ground circuit at its contact 6 which is normally extended to the incoming trunk over lead 329 for holding the hold magnets and relay 289 when the splitting relay 201 is operated. The splitting relay is now operated from battery through its winding, contact 4 of relay 112, lead 322, contact 6 of switches 300 and 302, contact 9 of relay 403, contact 1 of relay 706, to ground on contact 3 of relay 500. The operation of the splitting relay 201 opens the ground extended to the sleeve conductor 286 for maintaining the hold magnets operated and for maintaining relay 289 operated. Since this ground circuit was also opened in the position by the operation of relay 504, the hold magnets release the switches and relay 289 is also released. Since in this case, relay 114 was locked to this same ground, relay 114 also releases. A circuit for relay 117 is now established from battery through its winding, contact 5 of relay 114, normal, to ground in the timing circuit as previously traced. The operation of relay 117 opens the locking circuit of relay 202 which is extended through contact 7 of relay 117. The release of relay 202 releases the apparatus of the incoming trunk circuit. The release of relay 114 opens the circuit for the hold magnets 305 and 307 in the link switch and also the circuit for relay 411. However, at this time the channel relay 413 is operated which maintains a locking circuit for relay 411 to hold this channel busy until the channel apparatus has been released. The position circuit is released by the operation of relay 500 which is operated by the position release key 511 or by the backward release key 510. All of the circuits involved in the telephone connection are now prepared for energization by other incoming or outgoing calls.

What is claimed is:

1. In an automatic switching telephone system, incoming trunks, outgoing trunks, a train of automatic switches operable for connecting said incoming trunks to said outgoing trunks, operators' positions, a link switching system independent of said train of switches operable in response to a signal over an incoming trunk for connecting said incoming trunk to an operator's position, means under the direction of said operator for operating said train of switches to establish a connection between an incoming and an outgoing trunk, and means for optionally locking said link switches to said established connection.

2. In an automatic switching telephone system, incoming trunks, outgoing trunks, a train of automatic switches operable for connecting said incoming trunks to said outgoing trunks, operators' positions, a link operable in response to a signal over an incoming trunk for connecting said incoming trunk to said position, means under the direction of said operator for operating said train of switches for establishing a trunk line connection, means for registering the character of connection established, and means for locking said link to the connection established responsive to the operation of apparatus dependent upon the character of connection established.

3. In an automatic switching telephone system, incoming trunks, outgoing trunks, a train of automatic switches operable for connecting said incoming trunks to said outgoing trunks, an operator's position, a position circuit, a plurality of channels entering said position accessible to said position circuit, a link operable in response to a signal over an incoming trunk for connecting said incoming trunk to an idle channel of an operator's position, means under the direction of said operator for operating said train of switches for establishing a trunk line connection, and means for locking said link to maintain a continued connection between said position channel and the trunk connection.

4. In an automatic switching telephone system, incoming trunks, outgoing trunks, a train of automatic switches operable for connecting said incoming trunks to said outgoing trunks, an operator's position, a position circuit, a plurality of channels entering said position accessible to said position circuit, a link operable in response to a signal over an incoming trunk for connecting said incoming trunk to an idle channel of said operator's position, means under the direction of said operator for operating said train of switches for establishing a trunk line conection, means for registering the character of connection established, and means for optionally locking said link and channel to the established connection responsive to the operation of apparatus dependent upon the character of connection established.

5. In an automatic switching telephone system, incoming trunk lines of various classes, outgoing trunk lines of various classes, a train of automatic switches operable for connecting said incoming trunks to said outgoing trunks, operators' positions, a link operable in response to a signal over an incoming trunk for connecting said incoming trunk to an idle position, means under the direction of the operator for operating said train of switches to establish a telephone connection, registers, means for registering the class of the incoming trunk and outgoing trunk for said telephone connection, means under the control of said registers responsive to certain class registrations for locking said link between the position and trunk connection for the duration of the telephone connection, and means under the control of said registers responsive to other class registrations for releasing said link responsive to the establishment of said connection.

6. In an automatic switching telephone system, incoming trunks, outgoing trunks, a train of automatic switches operable for connecting said incoming trunks to said outgoing trunks, an operator's position, a position circuit having a telephone set, a plurality of channels entering said position accessible to said position circuit, a link operable in response to a signal over an incoming trunk for connecting said incoming trunk to an idle channel of an operator's position, means under the direction of said operator for operating said train of switches for establishing a trunk line connection between two parties, means for locking said link to maintain a continued connection between said position channel and the trunk line connection, means for releasing said position circuit, and means automatically responsive to a signal from a connected party for reconnecting the position circuit including the operator's telephone set to the established connection through said locked link.

7. In an automatic switching telephone system, incoming trunks, outgoing trunks, a train of automatic switches operable for connecting said incoming trunks to said outgoing trunks, an operator's position, a position circuit having a telephone set, a plurality of channels entering said position accessible to said position circuit, a link operable in response to a signal over an incoming trunk for connecting said incoming trunk to an idle channel of an operator's position, means under the direction of said operator for operating said train of switches for establishing a trunk line connection between two parties, means for locking said link to maintain a continued connection between said position channel and the trunk line connection, means for releasing said position circuit, means automatically responsive to a signal from a connected party for reconnecting the position circuit including the operator's telephone set to the established connection through said locked link and for operating visual and aural signals for indicating to this operator the character of call to be answered.

8. In an automatic switching telephone system, incoming trunks, outgoing trunks, a train of automatic switches operable for connecting said incoming trunks to said outgoing trunks, an operator's position, a position circuit, a plurality of channels entering said position accessible to said position circuit, a link operable in response to a signal over an incoming trunk for connecting said incoming trunk to an idle channel of an operator's position, means under the direction of said operator for operating said train of switches for establishing a trunk line connection, and means for optionally locking or releasing said link, means to release the position circuit and to maintain a continued connection between said position channel and the trunk line connection over a locked link, and means in said position circuit for supervising and monitoring on said established connection over said locked link at the will of the operator.

9. In an automatic switching telephone system, incoming trunks of various classes, outgoing trunks of various classes, automatically operable switches for connecting incoming trunks to outgoing trunks, operators' positions, a control unit, links, means for selecting an idle position and connecting a link between said position and a calling incoming trunk responsive to the actuation of this trunk, means for associating a control unit with said position and trunk circuit, means in an incoming trunk responsive to this connection for registering its trunk line classes in the position and control unit circuits, means in said operator's position for registering in said control unit the routing and class of the outgoing trunk for connection to said incoming trunk, means in said control unit for selecting an outgoing trunk as registered and for operating said switches to establish a telephone connection, means in said control unit responsive to the connection of an incoming trunk to an outgoing trunk for releasing the apparatus of this control unit and the apparatus of the operator's position circuit, means operable in said control unit for determining from the class registrations whether the link shall be locked between the trunk line connection and the selected operator's position for the duration of the telephone connection or whether the link shall be released with the release of the position circuit apparatus, means dependent upon this determining means for locking said link and means dependent upon this determining means for releasing said link.

10. In an automatic switching telephone system, incoming trunks of various classes, outgoing trunks of various classes, automatically operable switches for connecting incoming trunks to outgoing trunks, operators' positions, each having a plurality of channels therein, a control unit, links, means for selecting an idle channel of an operator's position and connecting a link between said channel and a calling incoming trunk responsive to the actuation of this trunk, means for associating a control unit with said position and trunk circuits, means in an incoming trunk responsive to this connection for registering its trunk line class in the position and control unit circuits, means in said operator's position for registering in said control unit the routing and class of the outgoing trunk for connection to said incoming trunk, means in said control unit for selecting an outgoing trunk as registered and operating said switches to establish a telephone connection between parties, means in said control unit responsive to the connection of an incoming trunk to an outgoing trunk for releasing the apparatus of this control unit and the apparatus of the operator's position circuit, means operable in said control unit for determining from the class registrations whether the link shall be locked between the trunk line connection and the selected channel of the operator's position for the duration of the telephone connection or whether the link shall be released with the release of the position circuit apparatus, means dependent upon this determining means for locking said link to the channel, means dependent upon this determining means for releasing said link and means automatically responsive to a signal from a connected party for reoperating the position apparatus through said locked link and channel.

11. In an automatic switching telephone system, incoming trunks of various classes, outgoing trunks of various classes, automatically operable switches for connecting incoming trunks to outgoing trunks, operators' positions, a control unit, links, means for selecting an idle position and connecting a link between said position and a calling incoming trunk responsive to the actuation of said trunk, means for associating a control unit with said position and trunk circuit, means in an incoming trunk responsive to said connection for registering its trunk line class in the position and control unit circuits, means in said operator's position for registering in said control unit the routing and class of the outgoing trunk for connection to said incoming trunk, means in said control unit for selecting an outgoing trunk as registered and for operating said switches to establish a telephone connection, means in said control unit responsive to the connection of an incoming trunk to an outgoing trunk for releasing the apparatus of said control unit and the apparatus of the operator's position circuit, and means operable in said control unit from said class registrations to delay the release of said operator's position circuit apparatus.

12. In an automatic switching telephone system, incoming trunks of various classes, outgoing trunks of various classes, automatically operable switches for connecting incoming trunks to outgoing trunks, operators' positions, a control unit, links, means for selecting an idle position and connecting a link between said position and a calling incoming trunk responsive to the actuation of said trunk, means for associating a control unit with said position and trunk circuit, means in an incoming trunk responsive to said connection for registering its trunk line class in the position and control unit circuits, means in said operator's position for registering in said control unit the routing and class of the outgoing trunk for connection to said incoming trunk, means in said control unit for selecting an outgoing trunk as registered and for operating said switches to establish a telephone connection, means in said control unit responsive to the connection of an incoming trunk to an outgoing trunk for releasing the apparatus of said control unit and the apparatus of the operator's position circuit, and means operable in said control unit from said class registrations to place the release of said operator's position circuit apparatus under the control of the operator at said position.

13. In an automatic switching telephone system, incoming trunks of various classes, outgoing trunks of various classes, automatically operable switches for connecting incoming trunks to outgoing trunks, operators' positions, a control unit, links, means for selecting an idle position and connecting a link between said position and a calling incoming trunk responsive to the actuation of said trunk, means for associating a control unit with said position and trunk circuit, means in an incoming trunk responsive to said connection for registering its trunk line class in the position and control unit circuits, means in said operator's position for registering in said control unit the routing and class of the outgoing trunk for connection to said incoming trunk, means in said control unit for selecting an outgoing trunk as registered and for operating said switches to establish a telephone connection, means in said control unit responsive to the connection of an incoming trunk to an outgoing trunk for releasing the apparatus of said control unit, means normally operated by said control unit for automatically releasing said operator's position circuit apparatus, and means operated in accordance with said class registrations to render said automatic releasing means ineffective.

14. In an automatic switching telephone system, incoming trunks of various classes, outgoing trunks of various classes, automatically operable switches for connecting incoming trunks to outgoing trunks, operators' positions, a control unit, links, means for selecting an idle position and connecting a link between said position and a calling incoming trunk responsive to the actuation of said trunk, means for associating a control unit with said position and trunk circuit, means in an incoming trunk responsive to said connection for registering its trunk line class in the position and control unit circuits, means in said operator's position for registering in said control unit the routing and class of the outgoing trunk for connection to said incoming trunk, means in said control unit for selecting an outgoing trunk as registered and for operating said switches to establish a telephone connection, means in said control unit responsive to the connection of an incoming trunk to an outgoing trunk for releasing the apparatus of said control unit, means normally operated by said control unit for automatically releasing said operator's position circuit apparatus and means operated in accordance with said class registrations to place the release of said operator's position circuit apparatus under the control of the operator at said position.

15. In an automatic switching telephone system, incoming trunks, outgoing trunks, a train of automatic switches operable for connecting said incoming trunks to said outgoing trunks, operators' positions, a link operable in response to a signal over an incoming trunk for connecting said incoming trunk to an idle operator's position, means under the direction of said operator for operating said train of switches for establishing a trunk line connection, means for registering the character of connection established, means operated in accordance with said registration to lock said link to the established connection or to release said link, and means in said established connection responsive to a recall thereover, said responsive means effective to signal said operator over the locked link and effective to operate an idle link to signal an idle operator in the absence of a locked link.

16. In an automatic switching telephone system, incoming trunks of various classes, outgoing trunks of various classes, automatically operable switches for connecting incoming trunks to outgoing trunks, operators' positions, a control unit, links, means for selecting an idle position and connecting a link between said position and a calling incoming trunk responsive to the actuation of said trunk, means for associating a control unit with said position and trunk circuit, means in an incoming trunk responsive to said connection for registering its trunk line class in the position and control unit circuits, means in said operator's position for registering in said control unit the routing and class of the outgoing trunk for connection to said incoming trunk, means in said control unit for selecting an outgoing trunk as registered and for operating said switches to establish a telephone connection, means in said control unit responsive to the connection of an incoming trunk to an outgoing trunk for releasing the apparatus of said control unit and the apparatus of the operator's position circuit, means in said established connection responsive to a recall, means in a locked link under the control of said responsive means to signal said selected operator, and means placed under the control of said responsive means by the release of said link to operate an idle link to select an idle operator's position.

17. In a telephone system, a plurality of subscriber lines, a plurality of A operator positions, a B operator position, means for establishing a connection between a calling one of said subscriber lines and an idle one of said A operator positions, means for establishing a connection between said one A operator position and said B operator position, means under the control of an operator at said one A operator position for establishing a connection between said one subscriber line and said B operator position excluding said one A operator position, and means under the control of an operator at said B operator position for positively selecting an idle one of said A operator positions to supervise the established connection between said one subscriber line and said B operator position.

18. In a telephone system, a plurality of subscriber lines, a plurality of A operator positions, a B operator position, means for routing a call upon any one of said subscriber lines to an idle one of said A operator positions to be answered, means for routing a call from said one A operator position to said B operator position, means for establishing a connection between said one subscriber line and said B operator position independent of said one A operator position, thereby to route a call from said one subscriber line to said B operator position, and means for positively routing a recall by an operator at said B operator position upon said established connection to an idle one of said A operator positions to be answered.

19. In a telephone system, a calling line, a called line, a plurality of operator positions, means for establishing a connection between said calling line and an idle one of said operator positions, means for establishing a connection between said one operator position and said called line, thereby to complete an established connection between said calling line and said called line including said one operator position, means for establishing a connection between said calling line and said called line excluding said one operator position, and means controllable over said last-mentioned established connection for positively selecting an idle one of said operator positions to supervise said last-mentioned established connection.

20. In a telephone system, a plurality of lines, a plurality of operator positions, means for establishing a connection between any one of said line and an idle one of said operator positions, thereby to extend a call from said one line to said one operator position to be answered, means for establishing a connection between said one operator position and another of said lines, thereby to extend a call from said one operator position to said other line, means for establishing a connection between said one line and said other line independent of said one operator position, thereby to extend a call from said one line to said other line, and means responsive to a recall upon said last-mentioned established connection for positively selecting an idle one of said operator positions to answer the recall upon said last-mentioned established connection.

JAMES B. McKIM.